(12) United States Patent
Shi et al.

(10) Patent No.: US 9,471,280 B2
(45) Date of Patent: Oct. 18, 2016

(54) EXTRACTION OF RANDOM NUMBERS FROM PHYSICAL SYSTEMS

(71) Applicant: The Regents of the University of Michigan, Ann Arbor, MI (US)

(72) Inventors: Yaoyun Shi, Ann Arbor, MI (US); Xiaodi Wu, Ann Arbor, MI (US); Kai-Min Chung, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 163 days.

(21) Appl. No.: 14/597,111

(22) Filed: Jan. 14, 2015

(65) Prior Publication Data
US 2015/0199178 A1 Jul. 16, 2015

Related U.S. Application Data

(60) Provisional application No. 61/927,472, filed on Jan. 14, 2014.

(51) Int. Cl.
*G06F 7/58* (2006.01)
*G06N 99/00* (2010.01)

(52) U.S. Cl.
CPC ............. *G06F 7/588* (2013.01); *G06N 99/002* (2013.01)

(58) Field of Classification Search
CPC .............................. G06F 7/588; G06N 99/002
USPC ................................................ 708/250–256
See application file for complete search history.

(56) References Cited

U.S. PATENT DOCUMENTS

| 6,393,447 B1 | 5/2002 | Jakobsson et al. |
| 7,437,081 B2 | 10/2008 | Mitchell et al. |
| 7,620,182 B2 | 11/2009 | Berzanskis et al. |
| 2005/0157875 A1 | 7/2005 | Nishioka et al. |
| 2006/0115086 A1 | 6/2006 | Beausoleil et al. |
| 2007/0244950 A1* | 10/2007 | Golic ...................... G06F 7/582 708/250 |

(Continued)

FOREIGN PATENT DOCUMENTS

WO    WO-03/040854 A2    5/2003

OTHER PUBLICATIONS

Barrett et al., No signaling and quantum key distribution, Phys. Rev. Lett., 95(1):010503 (2005).

(Continued)

*Primary Examiner* — Tan V. Mai
(74) *Attorney, Agent, or Firm* — Marshall, Gerstein & Borun LLP

(57) ABSTRACT

A method of generating a random bit string includes receiving a binary input string, creating copies of the binary input string received from the min-entropy source, and providing each of the copies of the binary input string to one of a plurality of randomness extractors. The method further includes, for each randomness extractor, providing the respective extracted output binary string to one of a plurality of quantum devices, where each of the plurality of quantum devices is configured to (i) receive the extracted output binary string as a locally random input signal string, random only to that respective quantum device, and (ii) transform the received locally random input string into a globally random output signal string. Still further, the method includes combining the plurality of globally random output signal strings from the plurality of quantum devices to generate the random bit string.

21 Claims, 21 Drawing Sheets

(56) References Cited

U.S. PATENT DOCUMENTS

| | | | |
|---|---|---|---|
| 2009/0169015 A1 | 7/2009 | Watanabe | |
| 2009/0265112 A1* | 10/2009 | Wilber | B82Y 10/00 |
| | | | 702/19 |
| 2011/0066669 A1* | 3/2011 | Sugimoto | G06F 7/588 |
| | | | 708/251 |
| 2011/0280397 A1 | 11/2011 | Patwar et al. | |
| 2012/0221615 A1 | 8/2012 | Cerf et al. | |

OTHER PUBLICATIONS

Colbeck et al., Free randomness can be amplified, Nat. Phys., 8:450-4 (2012).
Gallego et al., Full randomness from arbitrarily deterministic events, Nat. Comm., 4:2654 (2013).
Jain et al., Two-message quantum interactive proofs are in PSPACE. arXiv:0905.1300 (2009).
Li, New independent source extractors with exponential improvement, Electronic Colloquium on Computational Complexity, Report No. 147 (2012).
Masanes, Unconditional security of key distribution from causality constraints, arXiv:quanty-ph/0606049v4 (Dec. 10, 2009).
Masanes, Universally composable privacy amplification from causality constraints, Phys. Rev. Lett., 102:140501 (2009).
Mironowicz et al., Amplification of arbitrarily weak randomness, arXiv:1301.7722v1 (Jan. 31, 2013).
Ramanathan et al., Robust device independent randomness amplification, arXiv:1308.4635v1 (Aug. 21, 2013).
Rao, Randomness extractors for independent sources and applications, Ph.D. Thesis, The University of Texas at Austin (2007).
Santha et al., Generating quasi-random sequences from slightly-random sources, Proceedings of the 25th IEEE Symposium on Foundations of Computer Science, p. 434-40 (1984).
Vadhan, The unified theory of pseudorandomness, Proceedings of the International Congress of Mathematicians, Hyderabad, India (2010).
Zuckerman, General weak random sources, Foundations of Computer Science, Proceedings of the 31st Annual Symposium, pp. 534-543 (1990).
Abbott et al., Strong kochen-specker theorem and incomputability of quantum randomness, Phys. Rev. A, 86(062109) (2012).
Alon et al., Construction of asymptotically good lowrate error-correcting codes through pseudo-random graphs, IEEE Trans Inform. Theory, 38(2):509-16 (1992).
Alon et al., Simple constructions of almost k-wise independent random variables. Random Structures & Algorithms, 3(3):289-304 (1992).
Ball et al., Sharp uniform convexity and smoothness inequalities for trace norms. Inventiones mathematicae, 115:463-82 (1994).
Barrett et al., Memory attacks on device-independent quantum cryptography. Phys. Rev. Lett., 110:010503 (2013).
Barrett et al., Unconditionally secure device-independent quantum key distribution with only two devices. Phys. Rev. A, 86:062326 (2012).
Bennett et al., Quantum cryptography: public key distribution and coin tossing. Proceedings of the IEEE International Conference on Computers Systems and Signal Processing, 11:175-9 (1984).
Biham et al., A proof of the security of quantum key distribution. J. Cryptology: the Journal of the Int. Assoc. Cryptologic Res., 19(4):381-439 (2006).
Brandao et al., Robust Device-Independent Randomness Amplificiation with Few Devices. arXiv:1310.4544 (2013).
Chung et al., Physical randomness extractors: Generating Random Nos. with Minimal Assumptions,. arXiv:1402.4797 (2014).
Coudron et al., Infinite randomness expansion with a constant number of devices. Proceedings of the 46th Annual Symposium on Theory of Computing (STOC '14), pp. 427-436 (2014).
Dembo et al., Large Devitations Techniques and Applications. Springer, 2nd edition (1997).
Deng et al., Fault-tolerant quantum random-number generator certified by majorana fermions. Phys. Rev. A, 88:012323 (2013).
Ekert, Quantum cryptography based on Bell's theorem, Phys. Rev. Lett., 67:661-3 (1991).
Greenberger et al., Going beyond Bell's theorem, IN: Kafatos (ed.), Bell's Theorem, Quantum Theory, and Conceptions of the Universe, pp. 69-72, Dordrecht: Kluwer (1989).
Guruswami et al., Explicit capacity-achieving list-decodable codes, IN: Kleinberg (ed.), Proceedings of the 38th Annual ACM Symposium on Theory of Computing, pp. 1-10 (2006).
Guruswami et al., Linear-time encodable/decodable codes with near-optimal rate, IEEE Trans. Information Theory, 51(10):3393-400 (2005).
Guruswami, Algebraic-geometric generalizations of the Parvaresh-Vardy codes, ECCC Report TR05-132 (2005).
Guruswami, List decoding with side information, IEEE Conf. Computational Complexity, p. 300, IEEE Computer Society (2003).
Gutterman et al., Analysis of the linux random number generator, Proceedings of the 2006 IEEE Symposium on Security and Privacy, SP '06, pp. 371-385 (2006).
Horodecki et al., Contextuality offers device-independent security, 2010. arXiv:1006.0468v1.
Ji, Binary constraint system games and locally commutative reductions, arXiv:1310.3794 (2013).
Krishna et al., An entropic uncertainty principle for quantum measurements, Sankhya: The Indian Journal of Statistics, Series A, 64:842-851 (2002).
Lenstra et al., Ron was wrong, Whit is right. IACR Cryptology ePrint Archive, 2012:64 2012.
Lo et al., Unconditional security of quantum key distribution over arbitrarily long distances, Science, 283(5410):2050-6 (1999).
Mayers et al., Quantum cryptography with imperfect apparatus,. Proc. 39th FOCS, pp. 503-509 (1998).
Mayers, Unconditional security in quantum cryptography, J.ACM, 48(3):351-406 (2001).
McKague, Self-testing graph states, arXiv:1010.1989 (2010).
Miller et al., Optimal robust self-testing by binary nonlocal XOR games. In Severini et al. (eds.) 8th Conference on the Theory of Quantum Computation, Communication and Cryptography, TQC 2013, May 21-23, 2013, Guelph, Canada, vol. 22 of LIPIcs, pp. 254-262. Schloss Dagstuhl-Leibniz-Zentrum fuer Informatik, 2013. Full version: arXiv:1207.1819.
Naor et al., Small-bias probability spaces: Efficient constructions and applications, SIAM J. Computing, 22(4):838-56 (1993).
Nayak et al., Non-abelian anyons and topological quantum computation, Rev. Mod. Phys., 80:1083-159, (2008).
Renner. Security of Quantum Key Distribution. PhD thesis, ETH, 2005. arXiv:0512258.
Ristenpart et al., When good randomness goes bad: Virtual machine reset vulnerabilities and hedging deployed cryptography, NDSS:The Internet Society (2010).
Shor et al., Simple proof of security of BB84 quantum key distribution protocol, Phys. Rev. Lett., 85:441-444 (2000).
Smith, Scrambling adversarial errors using few random bits, optimal information reconciliation, and better private codes, IN: Bansal et al. (eds.), Proceedings of the Eighteenth Annual ACM-SIAM Symposium on Discrete Algorithms, pp. 395-404 (2007).
Tomamichel et al., Uncertainty relation for smooth entropies, Phys. Rev. Lett., 106:110506 (2011).
Um et al., Experimental certification of random numbers via quantum contextuality, Scientific Reports, p. 1627 (2013).
Tomamichel, et al. "Randomness Extraction Against Quantum Side Information," QSIT Meeting Passugg, pp. 15-16 (2010).
Written Opinion of the International Searching Authority from PCT/US2015/011476 dated Oct. 30, 2015.
International Search Report from PCT/US2015/011476 dated Oct. 30, 2015.
Chung et al., Robust device-independent randomness amplification from any min-entropy source, Oct. 15, 2013.
Colbeck et al., Private randomness expansion with untrusted devices, J. Phys. A: Mathematical and Theoretical, 44(9):095305 (2011).

(56) References Cited

OTHER PUBLICATIONS

Colbeck, Quantum and relativistic protocols for secure multi-party computation, Ph.D. Thesis, University of Cambridge (2006).
Coudron et al., Robust randomness amplifiers: upper and lower bounds, in: Raghavendra et al. (eds.), Approximation, Randomization and Combinatorial Optimization. Algorithms and Techniques—16th International Workshop, APPROX 2013, and 17th International Workshop, RANDOM 2013, Berkeley, California, Aug. 21-23, 2013.
De et al., Trevisan's extractor in the presence of quantum side information, SIAM J. Computing, 41(4):915-40 (2012).
Dupuis et al., Entanglement sampling and applications, IEEE Transactions on Information Theory, 61:1093-112 (2015).
Fehr et al., Security and composability of randomness expansion from bell inequalities, Phys. Rev. A, 87:012335 (Jan. 2013).
Heninger et al., Mining your ps and qs: detection of widespread weak keys in network devices, IN: Proceedings of the 21st USENIX Security Symposium (2012).
Jaksic et al., Entropic fluctuations in quantum statistical mechanics (Jun. 19, 2011).
Klyachko et al., A simple test for hidden variables in spin-1 system, Phys. Rev. Lett., 101:020403 [arXiv:0706.0126] (2008).
Miller et al., Optimal robust quantum self-testing by binary nonlocal XOR games, arXiv:1207.1819, v4 (2013).
Miller et al., Self-testing quantum dice certified by an uncertainty principle, presented at Quantum Information Processing (QIP) workshop (Feb. 2014).
Muller-Lennert et al., On quantum renyi entropies: a new definition and some properties, arXiv:1306.5358 (Jun. 26, 2013).
Pironio et al., Random Nos. certified by bell's theorem, Nature: 464:1021 (2010).
Pironio et al., security of practical private randomness generation, Phys. Rev. A, 87:012336 (Jan. 2013).
Pisier et al., Noncommutative $L^p$-spaces, in: Handbook of the Geometry of Banach Spaces, vol. 2, pp. 1459-1517, North Holland, Amsterdam (2003).
Reichardt et al., Classical command of quantum systems, Nature, 496:456-60 (2013).
Tomamichael et al., a fully quantum asymptotic equipartition property, IEEE Trans. on Inf. Theory, 55(12):5840-7 (2009).
Trevisan, Extractors and pseudorandom generators, J. ACM, 48(4):860-79 (Jul. 2001).
Vazirani et al., Certifiable quantum dice, Phil. Trans. R. Soc. A, 370:3432-48 (2012).
Vazirani et al., Fully device independent quantum key distribution, Phys. Rev. Lett., 113:140501 [arXiv:1210.1810 </abs/1210.1810>](2014).
Werner et al., All multipartite Bell correlation inequalities for two dichotomic observables per site, Phys. Rev. A, 64(3):32112 (Sep. 2001).
Wilde et al., Strong converse for the classical capacity of entanglement-breaking and Hadamard channels via a sandwiched Renyi relative entropy, arXiv:1306.1586 (2013).
International Preliminary Report on Patentability from Application No. PCT/US2015/011476 dated Jul. 19, 2016.

\* cited by examiner

*Arguments:*

$N$ : A positive integer (the output length).
 $m$ : A positive integer (the number of measurement settings).
 $x$ : A real number from the interval $(0, \frac{1}{2})$. (The failure tolerance.)
 $q$ : A real number from the interval $(0, 1)$. (The test probability.)
 $f$ : A contextuality game.
 $D$ : A contextual measurement device $D$ whose set of contexts contains $\text{Supp } f$.

Protocol K:

1. Choose a bit $g \in \{0, 1\}$ according to the distribution $(1-q, q)$.
2. If $g = 0$ ("generation round"), then give the context $(1)$ to $D$ and record the output bit $o$.
3. If $g = 1$ ("test round"), then play game $f$ with $D$. If the score is $+1$, then let $o = 0$. If the score is $-1$, then let $o = 1$.
4. Repeat to obtain a sequence of bits $g_1, \ldots, g_N$ and $o_1, \ldots, o_N$.
5. If $$\sum_{i=1}^{N} g_i o_i > xqN, \quad (N.2)$$

then the protocol aborts. Otherwise, it succeeds, and the output is the bit sequence $o_1, \ldots, o_N$.

*FIG. 8*

*Arguments:*

$N$ : A positive integer (the output length).
$v$ : A real number from the interval $[\frac{1}{2}, 1]$. (The commutativity parameter.)
$\chi$ : A real number from the interval $(0, \frac{1}{2})$. (The failure tolerance.)
$q$ : A real number from the interval $(0, 1)$. (The test probability.)
$D$ : A binary device with commutativity parameter $v$.

Protocol U:

1. Bits $g_1, g_2, \ldots, g_N$ are chosen at independently at random according to a $(1-q, q)$ distribution, and given (in order) to device $D$ to produce output bits $o_1, o_2, \ldots, o_N$.
2. If $$\sum_{i=1}^{N} g_i o_i > \chi q N, \quad (\text{M.1})$$

then the protocol *aborts*. Otherwise, it succeeds, and the output is the bit sequence $o_1, \ldots, o_N$.

*FIG. 9*

Protocol A:

*Arguments:*

- $N$ = positive integer
- $q \in (0,1)$
- $\eta \in (0,1/2)$
- $D$ = device with trusted measurements 1. A bit $g \in \{0,1\}$ is chosen according to a biased $(1-q, q)$ distribution. The bit $g$ is given to $D$ as input, and an output bit $o$ is recorded.
2. If $g = 1$ and the output given by $D$ is 0, then the event $P$ ("pass") is recorded. If $g = 1$ and the output is 1, the event $F$ ("fail") is recorded.
3. If $g = 0$ and the output given by $D$ is 0, then the event $H$ ("heads") is recorded. If $g = 0$ and the output is 0, the event $T$ ("tails") is recorded.
4. Steps 1–3 are repeated $N-1$ (more) times. Bit sequences $\mathbf{g} = (g_1, \ldots, g_N)$ and $\mathbf{o} = (o_1, \ldots, o_N)$ are obtained.
5. If the total number of failures is more than $\eta q N$, the protocol aborts. Otherwise, the protocol succeeds. If the protocol succeeds, it outputs the bit sequences $\mathbf{g}$ and $\mathbf{o}$.

*FIG. 15*

Protocol A:

*Arguments:*

- $v$ = real number such that $v \in (0, 1]$.
- $h$ = real number such that $h \in (0, 1 - v]$.
- $N$ = positive integer
- $q \in (0, 1)$
- $\eta \in (0, v/2)$
- $D$ = partially trusted device with parameters $(v, h)$.

1. A bit $g \in \{0, 1\}$ is chosen according to a biased $(1-q, q)$ distribution. The bit $g$ is given to $D$ as input, and the output bit $o$ is recorded.

2. If $g = 1$ and the output given by $D$ is $0$, then the event $P$ ("pass") is recorded. If $g = 1$ and the output is $1$, the event $F$ ("fail") is recorded.

3. If $g = 0$ and the output given by $D$ is $0$, then the event $H$ ("heads") is recorded. If $g = 0$ and the output is $0$, the event $T$ ("tails") is recorded.

4. Steps 1 – 3 are repeated $N - 1$ (more) times. Bit sequences $\mathbf{g} = (g_1, \ldots, g_N)$ and $\mathbf{o} = (o_1, \ldots, o_N)$ are obtained.

5. If the total number of failures is greater than $(h/2 + \eta)qN$, then the protocol aborts. Otherwise, the protocol succeeds. If the protocol succeeds, it outputs the bit sequences $\mathbf{g}$ and $\mathbf{o}$.

FIG. 16

# EXTRACTION OF RANDOM NUMBERS FROM PHYSICAL SYSTEMS

CROSS-REFERENCE TO RELATED APPLICATIONS

This application claims priority to U.S. Provisional Patent Application No. 61/927,472, filed on Jan. 14, 2014, and titled "EXTRACTION OF RANDOM NUMBERS FROM PHYSICAL SYSTEMS," the entire disclosure of which is hereby expressly incorporated by reference herein.

STATEMENT OF GOVERNMENTAL INTEREST

This invention was made with government support under CCF1216729, CCF1318070 and CCF1017335 awarded by the National Science Foundation. The Government has certain rights in the invention.

BACKGROUND OF THE DISCLOSURE

1. Field of the Disclosure

The present disclosure relates to generating random numbers and, more particularly, to techniques for extracting random numbers from untrusted quantum devices.

2. Brief Description of Related Technology

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Randomness is an indispensable resource for modern day information processing. Without randomness, randomized algorithms, statistical scientific simulations, and secure cryptography would not exist. However, generating randomness is a fundamental problem that is far from fully solved. In fact, many secret keys currently in use can be broken by exploiting the insufficient randomness used in generating the keys.

Quantum mechanics is inherently random, therefore offers promising approaches to this problem. Indeed, commercial products to this end have started to emerge. However, numerous challenges remain. As classical beings, users of those quantum-based products cannot directly verify if the quantum states and quantum operations conform to the specifications. Implementations of quantum operations are, at least in the foreseeable future, far from ideal (e.g., the implementations include unpredictable deviations or errors). These imperfections call for secure protocols that tolerate deviations of quantum devices from ideal specifications. Furthermore, users requiring high levels of security often have to purchase devices from a vendor who is not necessarily trusted. Further still, while some proposed techniques are suggested to have higher levels of security, such techniques require quantum conditions that are not attainable in the real world settings.

SUMMARY OF THE DISCLOSURE

In accordance with an example, a method of generating a random bit string comprises receiving, from a min-entropy source, a binary input string, creating copies of the binary input string received from the min-entropy source, and providing each of the copies of the binary input string to one of a plurality of randomness extractors, each randomness extractor configured to perform a different randomness extraction on the received copy of the binary input string to produce a respective extracted output binary string. The method further includes, for each randomness extractor, providing the respective extracted output binary string to one of a plurality of quantum devices, where each of the plurality of quantum devices is configured to (i) receive the extracted output binary string as a locally random input signal string, random only to that respective quantum device, and (ii) transform the received locally random input string into a globally random output signal string, random to each other of the plurality of quantum devices. Still further, the method includes combining the plurality of globally random output signal strings from the plurality of quantum devices to generate the random bit string.

In accordance with one example, a method of generating a random bit string comprises receiving, from each of one or more min-entropy sources, a binary input string and interacting with one or more input/output devices, where each input/output device is an untrusted system configured to produce a global randomness output from a local randomness input seed. The method further includes determining whether to accept the global randomness output from each of the input/output devices or to reject the global randomness output from each of the input/output devices, and outputting the random bit string, if the global randomness output from each of the input/output devices is accepted.

In accordance with an example, a system for generating a random bit string comprises a classical controller configured (i) to receive, from a min-entropy source, a binary input string, (ii) to duplicate the binary input string to create copies of the binary input string, and (iii) provide each of the copies of the binary input string to one of a plurality of randomness extractors, each randomness extractor configured to perform a different randomness extraction on the received copy of the binary input string to produce a respective extracted output binary string. The system further includes a plurality of quantum devices each configured to (i) receive the extracted output binary string as a locally random input signal string, random only to that respective quantum device, and (ii) transform the received locally random input string into a globally random output signal string, random to each other of the plurality of quantum devices; and a combination stage configured to combine the plurality of globally random output signal strings from the plurality of quantum devices to generate the random bit string.

In accordance with an example, a system for generating a random bit string comprises a classical controller configured to receive, from each of one or more min-entropy sources, a binary input string and interact with one or more input/output devices, where each input/output device is an untrusted system configured to produce a global randomness output from a local randomness input seed. The classical controller is further configured to determine whether to accept the global randomness output from each of the input/output devices or to reject the global randomness output from each of the input/output devices, and output the random bit string, if the global randomness output from each of the input/output devices is accepted.

BRIEF DESCRIPTION OF THE DRAWING FIGURES

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 8 illustrates a flow of the example protocol illustrated in FIG. 5;

FIG. 9 illustrates yet another protocol generalizing the protocols of FIGS. 3 and 5;

FIG. 15 illustrates yet another example protocol for generating a random output based on a binary input; and FIG. 16 illustrates an example protocol for simultaneous quantum key distribution and randomness expansion.

DETAILED DESCRIPTION OF PREFERRED EMBODIMENTS

Figure 1:
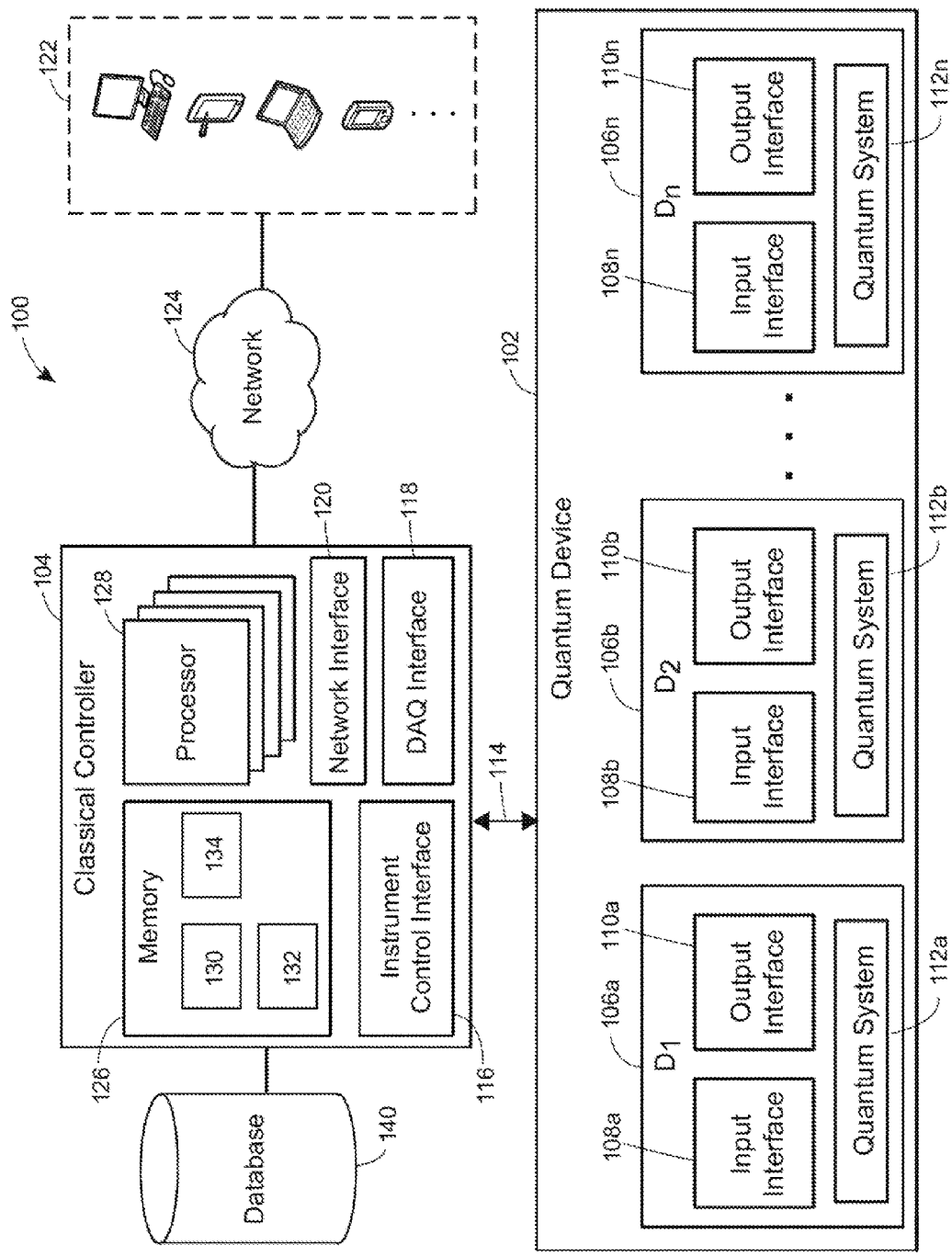
FIG. 1 is a block diagram of an example system for generating random numbers, expanding randomness, and/or distributing quantum keys.

The techniques of the present disclosure provide random number generation determined using randomness extractors. In comparison to conventional random number generators, the present techniques allow for a more expansive set of sources for random number generation. For example, the present techniques may be used with min-entropy and physical sources that have a certain amount of inherent randomness. The techniques employ extractors, employing a deterministic process, that interact with multiple physical sources with the purpose of outputting true randomness. The physical systems may be subject to easily verifiable constraints imposed by certain physical theories, such that the security of an extractor may be based on the validity of those physical theories.

In this way, the present techniques can circumvent the independent-sources limitations of conventional techniques, through the use of physical sources such as spatially separated untrusted physical sources of quantum randomness.

For this latter implementation with untrusted quantum sources, the only additional source of randomness used is a single classical signal source of a guaranteed min-entropy. For implementation, the only additional quantum source would be a min-entropy input signal source. This combination of a weak-random input source (min-entropy) and spatially separated untrusted quantum-device physical sources is able to produce an output that is secure against adversary. Thus, the present techniques can be used for random number generation, random number expansion, quantum key distribution and secured communications, and other applications.

With conventional techniques for random number generation, there is a fundamental limit requiring two or more independent sources that the present techniques overcome. The research on the minimum assumptions under which true randomness can be obtained has led to theories of randomness extractors. An extractor is a deterministic process that transforms several sources of weak randomness into near perfect randomness. A basic component of conventional theories on extractors is that the amount of randomness in each weak source is quantified by the notion of min-entropy (or conditional quantum min-entropy when the adversary is quantum). The choice of this description is supported by the fact that the min-entropy of a source characterizes the maximum amount of securely extractable randomness with the help of additional randomness. On the other hand, deterministic extraction, i.e., in the absence of additional randomness, is considered to be impossible. To get around this perceived impossibility, some have settled on making additional independence assumptions, and aiming for a randomness extractor either with one short truly random seed, or by using two or more independent weak sources. In either case, independence is crucial for randomness extraction to be possible. A classical signal source (such as a random binary string) is said to be of min-entropy k, if no classical adversary can guess the signal correctly with more than $2^{-k}$ probability. Likewise, the source is said to have k conditional quantum min-entropy, if no quantum adversary can guess it correctly with more than $2^{-k}$ probability.

In contrast to conventional techniques, the present techniques provide random number generation that does not require independent sources, is quantum-secure, achieving close to optimal error parameters, and randomness that expands at an exponential or unbounded rate from a weak min-entropy source. The techniques can tolerate a constant, or uniform, level of imprecision in implementing each quantum operation. That is, with the present techniques, any honest implementation performing below an optimal level by a small constant amount, on average may still pass randomness and/or security tests with overwhelming (and unexpected) probability.

The present techniques deploy quantum devices that exhibit protocols (which may be considered sub-protocols, to the over all system-level protocol) that enable practical random number generation, with the minimal assumption on the weak-random source and on the generating device. In some examples, the techniques work with any min-entropy source, instead of requiring a source possessing additional structure or quantum randomness. Requiring additional structures, such as independent sources, presents difficult challenges to achieve practically; therefore these challenges be avoided.

The present techniques may be resilient to the implementation imprecisions of the quantum devices used. That is the present techniques offer greater robustness over what was generally considered achievable with conventional techniques. Robustness, which includes allowing for a certain amount of inaccuracy in operation, is valuable for quantum information processing, in part, because quantum states are extremely fragile and quantum operations are inaccurate. Moreover, the present techniques may achieve a security parameter close to the best possible. The techniques have lead to a striking conclusion, that any min-entropy source of a fixed length can be used to extract, robustly and securely, from untrusted quantum devices, an arbitrarily long output randomness (random number) of close to the best possible quality.

In addition to the above implications on randomness extraction, these techniques can be used to create inherently random events in the laboratories with confidence of their unpredictability.

System Overview

FIG. 1 illustrates an example system 100 for generating random numbers, expanding randomness, and/or distributing quantum keys. The system 100 includes a quantum device 102 operatively and communicatively connected to a classical controller 104. The quantum device 102 and the classical controller 104 may be part of a quantum computing system, in an implementation. For example, the quantum device 102 may operate (e.g., perform computations) based on quantum-mechanical principles, such as entanglement, and the classical controller 104 may control or interact with the quantum device 102 based principles of classical mechanics. In some implementations, the classical controller 104 may prepare quantum systems of the quantum device 102 in one or more initial states so as to perform a computation. The classical controller 104 may also initiate and/or control measurements (e.g., nondestructive measurements) of the quantum systems so as to output results of a computation.

In some implementations, the quantum device 102 may include a plurality of components 106a-106n (also labeled as $D_1, D_2, \ldots, D_n$ in FIG. 1), where each of the plurality of components includes a corresponding input interface 108a-108n, output interface 110a-110n, and quantum system 112a-112n. Generally, the quantum systems 112a-112n may include any suitable systems governed by quantum-mechanical principles and capable of performing operations on data or input based on those quantum-mechanical principles. The quantum systems 112a-112n may represent data or input via quantum-mechanical properties, such as spin, charge, polarization, optical properties, thermal properties, magnetic properties, etc., and, in some cases, each of the quantum systems 112a-112n may include one or more "qubits," such as two-state quantum-mechanical systems.

The quantum systems 112a-112n may by implemented as physical sources, such as spatially separated untrusted quantum devices. These physical sources may be constructed from different physical devices, in some examples. In some examples, the physical sources may be separate physical sources of a single physical device. Each of the quantum systems 112a-112n may be execute a protocol to convert a locally random input into a globally random output, as described below, as discussed in reference to FIG. 3A, for example. In some examples, the quantum systems 112a-112n may represent single quantum sources employ a protocol. In some examples, each quantum system 112a-112n may represent multiple sub-systems, each employing the protocol.

By way of example and without limitation, the quantum systems 112a-112n may include: (i) an Ising spin glass in which data is represented by Ising spins; (ii) non-Abelian topologically ordered phases of matter in which data is represented by braiding of anyonic quasiparticles; (iii) three dimensional (3D) lattice cluster states in which data is represented by topologically protected quantum gates; (iv) superconducting systems in which data is represented by small superconducting circuits (e.g., Josephson junctions); (v) trapped atoms, ions, or molecules (e.g., trapped by electromagnetic fields or optical lattices) in which data is represented by two or more energy levels, such as hyperfine levels; (vi) one or more quantum dots (or quantum wells) in which data is represented by confined excitations; (vii) linear optical elements in which data in represented by optical modes of photons; or (viii) Bose-Einstein condensates in which data is represented by one or more energetically protected two-level states. It is understood, that any suitable quantum system may represent data or input via quantum-mechanical properties and perform operations on that data based on the quantum-mechanical properties.

Preparation or manipulation of the quantum systems 112a-112n and obtaining of results from the quantum systems 112a-112n may include measurements performed by the corresponding input interfaces 108a-108n and the corresponding output interface 110a-110n, in some implementations. For example, in a case in which the quantum systems 112a-112n include topologically ordered phases of matter (e.g., as in a topological quantum computer), the input interfaces 108a-108n and the output interfaces 110a-110n may include one or more interferometers to perform quasi-particle braiding, topological charge measurement, and/or other topologically transformative manipulations. Alternatively, in the case in which the quantum systems 112a-112n include superconducting systems, the input interfaces 108a-108n and the output interfaces 110a-110n may include various superconducting quantum interference devices (SQUIDs) to measure magnetic properties with high sensitivity. It is understood, however, that the input interfaces 108a-108n and the output interfaces 110a-110n may include any appropriate combination of hardware, classical computer processing, and/or software components configured to measure, manipulate, and/or otherwise interact with the quantum systems 112a-112n. Moreover, in some examples, the input interfaces 108a-108n may include a duplicator and extractor, as described hereinbelow, that receives a common input signal and sends an extracted signal to the different sub-protocol portions of the quantum devices 112a-112n. In some other examples, the duplicator and extractor are within the quantum systems 112a-112n.

Further, some or all of the input interfaces 108a-108n and the output interfaces 110a-110n may be controlled by or communicate with the classical controller 104 in order to measure, manipulate, and/or otherwise interact with the quantum systems 112a-112n, in an implementation. For example, the input interfaces 108a-108n may receive input data values (e.g., input bits) from the classical controller 104 that are subsequently encoded in the quantum systems 112a-112n via operations (e.g., measurements) performed by the input interfaces 108a-108n. Likewise, the output interfaces 110a-110n may communicate results, obtained via measurements performed on the quantum systems 112a-112n, to the classical controller 104 for further processing or utilization. In some cases, the classical controller 104 may implement software applications, via computer-readable instructions, that control all or some of the functionality of the input interfaces 108a-108n and the output interfaces 110a-110n. For example, the classical controller 104 may control when (e.g., periodically or at pre-defined times) and how (e.g., with what parameters, such as intensity, voltage, etc.) the input interfaces 108a-108n and the output interfaces 110a-110n perform measurements on the quantum systems 112a-112n.

In some implementations, the plurality of components 106a-106n are configured such that information cannot be exchanged among the plurality of components 106a-106n during certain quantum operations, such as random number generation, randomness expansion, or quantum key distribution. For example, the plurality of components 106a-106n may be disposed in locations far apart from one another so as to ensure that during the period of generating a bit of a random number, the plurality of components 106a-106n cannot exchange information due to a limit imposed by special relativity (i.e., information cannot travel faster than the speed of light). Such a separation of the plurality of components 106a-106n may be referred to as "isolated" or "in isolation" herein. In general, quantum communication or a quantum exchange of information may include any intentional or accidental coupling with an environment (e.g., a coupling that includes a decoherence of quantum states).

In other implementations, the plurality of components 106a-106n are configured such that information cannot be exchanged among the plurality of components 106a-106n during certain stages or phases of a quantum operation, while information can be exchanged during other stages or phases of the quantum operation. For example, the plurality of components 106a-106n may be disposed in locations such that during one iteration of a protocol, such as the protocols discussed with reference to FIGS. 6, 8, and 10, information cannot be exchanged between the plurality of components 106a-106n, while information can be exchanged in between iterations. Such a configuration of the plurality of components 106a-106n may be referred to as "resettable" or "being reset" herein. In this manner, protocols may be implemented with reduced complexity, in some cases. For example, the quantum device 102 may establish entanglement "on-the-fly" and needs only to maintain the entanglement (e.g., with a constant level of fidelity) for the duration of a single protocol iteration.

Communications between the classical controller 104 and the input interfaces 108a-108n and the output interfaces 110a-110n may include classical communications, in an implementation, facilitated by a control and measurement link 114. The control and measurement link 114 may carry communications from the classical controller to the interfaces 108a-108n and 110a-110n via electromagnetic signals (e.g., current signals) on a current-carrying conductor, such as a ribbon, coaxial, twisted pair, universal serial bus (USB), or other cable. The control and measurement link 114 may, in some implementations, carry encoded digital signals between the classical controller 104 and the interfaces 108a-108n and 110a-110n, such as signals encoded according to the Hypertext Transfer Protocol (HTTP), Virtual Instrument Software Architecture (VISA) standard, Standard Commands for Programmable Instruments (SCR), High-Speed LAN Instrument Protocol (HiSLIP), LAN eXtensions for Instrumentation (LXI), PCI eXtensions for Instrumentation (PXI), File Transfer Protocol (FTP), Transmission Control Protocol (TCP), User Datagram Protocol (UDP), etc. In general, the control and measurement link 114 may include any suitable wired and/or wireless components, links, modems, routers, cables, buses, etc. allowing the classical controller 104 to communicate with and/or control the quantum device 102.

The classical controller 104 may include various interfaces, implemented in any suitable combination of hardware and software, allowing the classical controller 104 to communicate with the quantum device 102 and various other devices or components. In particular, the classical controller 104 may include an instrument control interface 116 configured to send/receive control signals (voltages, currents, digitally encoded messages, etc.) to and from the quantum device 102, respectively. The classical controller 104 may also include a data acquisition (DAQ) interface 118, such as a DAQ PCI card, to receive measurement values from the quantum device 102 (e.g., from the output interfaces 110a-110n) and a network interface 120 allowing the classical controller 104 to communicate with various other network-enabled devices 122.

Users of the network-enabled devices 122 may interact with the classical controller 104 via a network 124 and network interface 120. The network-enabled devices 122 may include, by way of example, a network-enabled cellular wireless terminal, a phone, a tablet computer, a desktop computer, a server computer, a cluster of server computers, a personal digital assistant (PDA), a smartphone, a laptop computer, a wearable wireless communication device such as a wearable computer, a portable media player, an e-reader, or other similar devices (not shown). Of course, any network-enabled device appropriately configured may interact with the classical controller 104 to, for example, generate a random number, expand a random number, and/or generate or retrieve a quantum key. In some examples, the network-enabled devices 122 represent a network-enabled enterprise in communication with the classical controller 104 of another network-enabled enterprise. Example enterprises, including any two enterprises desiring to establish shared secured communications, such as a design enterprise creating intellectual property (e.g., an integrated circuit designer) and a manufacturing enterprise (fabrication enterprise or foundry).

The network 124 may be a proprietary network, a secure public Internet, a virtual private network or some other type of network, such as dedicated access lines, plain ordinary telephone lines, satellite links, combinations of these, etc. Where the network 124 comprises the Internet, data communication may take place over the network 124 via an Internet communication protocol. The network 124 may communicate with the network-enabled devices 122 through wireless or wired connections. Further, in some examples, the network 124 is a mobile (or cellular) communication network.

The network-enabled devices 122 need not necessarily communicate with the network 124 via a wired connection. In some instances, the network-enabled devices 122 may communicate with the network 124 via wireless signals; and, in some instances, the network-enabled devices 122 may communicate with the network 124 via an intervening wireless or wired device, which may be a wireless router, a wireless repeater, a base transceiver station of a mobile telephony provider, etc., or other access point.

The classical controller 104 also includes a program memory 126 and one or more processors 128 (e.g., microcontrollers or microprocessors). The program memory 126 may include an assortment of computer-readable media implemented as semiconductor memories, magnetically readable memories, and/or optically readable memories, for example. Computer-readable media may be any media that may be accessed by the classical controller 104. By way of example, and not limitation, the media may include both volatile and nonvolatile media, removable and non-removable media. Media may also include computer storage media and communication media. Computer storage media may include volatile and nonvolatile, removable and non-removable media that stores information such as computer-readable instructions, program modules, data structures, or other data. Computer-storage media may include RAM, ROM, EEPROM, or other memory technology, optical storage disks, magnetic storage devices, and any other medium that may be used to store computer-accessible information. Communication media may be computer-readable instructions, data structures, program modules, or other data in a modulated data signal or other transport mechanism. Communication media may include wired media such as a wired network or direct-wired connection, and wireless media such as RF, infrared, and other wireless media.

The program memory 126 may store a basic input/output system (BIOS), containing algorithms to transfer information between components within the classical controller 104. Also, data or program modules that are immediately accessible or are presently in use by the one or more processors 128 may be stored in the program memory 126. Data normally stored in the program memory 126 while the classical controller 104 is in operation may include an operating system, application programs, program modules, and program data. In particular, the program memory 126 may store a random number generation program 130, a randomness expansion program 132, and a quantum key distribution program 134, as discussed further with reference to FIGS. 6, 8, 10, and 11. Programs, such as the programs 130, 132, and 134, may, in some implementations, provide input to or process output from the quantum device 102. That is, some functionality related to random number generation, randomness expansion, and quantum key distribution may be implemented by the classically executed programs 130, 132, and 134, whereas other functionality related to random number generation, randomness expansion, and quantum key distribution may be implemented according to quantum-mechanical principles by the quantum device 102.

The classical controller 104 may also be communicatively coupled to a database 140. The database 140 may include storage media such as a hard disk drive that may read from or write to non-removable, non-volatile magnetic media, a magnetic disk drive that reads from or writes to a removable, non-volatile magnetic disk, and an optical disk drive that reads from or writes to a removable, nonvolatile optical disk. Other storage media that may be used includes magnetic tape cassettes, flash memory cards, digital versatile disks, digital video tape, solid state RAM, and solid state ROM. The database 140 may store results from computations performed by the quantum device 102, such as random numbers, quantum keys, etc. In addition, the database 140 may store instructions, rules, or other information allowing the classical controller 104 to execute corresponding functionality.

FIGS. 2A-2D are block diagrams of particular example configurations of the system 100 illustrated in FIG. 1. Although particular numbers of network-enabled devices, networks, classical controllers, quantum devices, and components of quantum devices are illustrated in FIGS. 2A-2D, it is understood that any number of such devices or components may be implemented in any suitable combination. Further, for ease of discussion, components included in classical controllers and quantum device components are not shown in FIGS. 2A-2D, but it is understood that the classical controllers and/or quantum devices of FIGS. 2A-2D may include some or all the components illustrated in the classical controllers and quantum devices of FIG. 1.

Figure 2A:
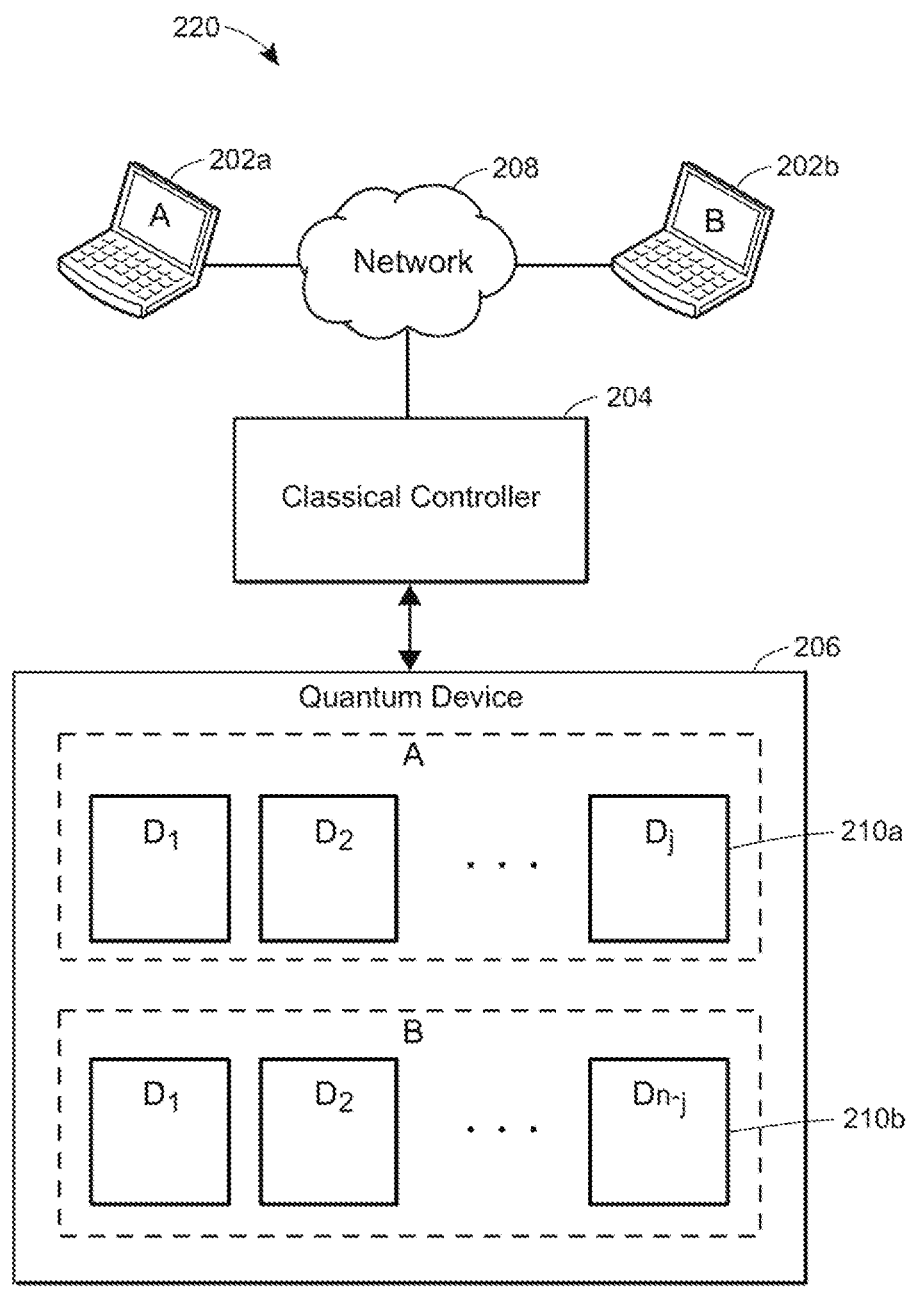
FIGS. 2A-2D are block diagrams of various example configurations of the system illustrated in FIG. 1.

In particular FIG. 2A is a block diagram of an example system 200 in which a network-enabled device 202a (labeled "A" in FIG. 2A) and a network-enabled device 202b (labeled "B" in FIG. 2A) may interact with a classical controller 204, where the classical controller 204 is communicatively and/or operatively connected to a quantum device 206. Although illustrated as laptop computers in FIG. 2A, it is understood that the network-enable devices 202a and 202b may include any suitable network-enabled devices, such as those discussed with reference to FIG. 1. The network-enabled devices 202a and 202b may communicate with the classical controller 204 via the network 208

Each of the network-enabled devices 202a and 202b may have access to (e.g., be able to interact with via the classical controller 204) one or more quantum components 210a and 210b, respectively. These quantum components 210a and 210b may represent physical sources of quantum randomness, for example, where each device, D, or where pairs of devices, D, execute a protocol converting a locally random input into a globally random output, for example, as discussed in reference to the example of FIG. 3A. In particular the network-enabled device 202a may interact with, through communications with the classical controller 204, the quantum components 210a, which are j in number. Likewise, the network-enabled device 202b may interact with, through the communications with the classical controller 204, the quantum components 210b, which are n−j in number. That is, the total number, n, of components of the quantum device 206 are split between the network-enabled devices 202a and 202b, in an implementation. In general, the number j may be any suitable number, such as one, two, three, etc. up to n−1. Further, in some cases, the quantum components 210a and the quantum components 210b may be isolated from one another, and, in other cases, the quantum components 210a and the quantum components 210b may be resettable allowing quantum communication between protocol iterations. As physical sources, these quantum components 210a and 210b may be spatially separated untrusted quantum devices, for example.

Access of the multiple network-enabled devices 202a and 202b to the corresponding quantum components 210a and 210b may allow multiple network-enabled device to carry out quantum computations simultaneously or cooperatively, in an implementation. For example, the network-enabled devices 202a and 202b may initiate a quantum key generation scheme, as further discussed with reference to FIG. 14, where each of the network-enabled devices 202a and 202b are able to initiate respective random number generation protocols via the corresponding quantum components 210a and 210b. In general, however, the network-enabled devices 202a and 202b may perform quantum operations via the corresponding quantum components 210a and 210b independently and for any suitable purpose.

The network-enabled devices 202a and 202b may also communicate with each other, in some implementations, via the network 208. For example, the network-enabled devices 202a and 202b may communicate as part of a quantum key distribution protocol and may communicate securely after sharing a generated quantum key.

Figure 2B:
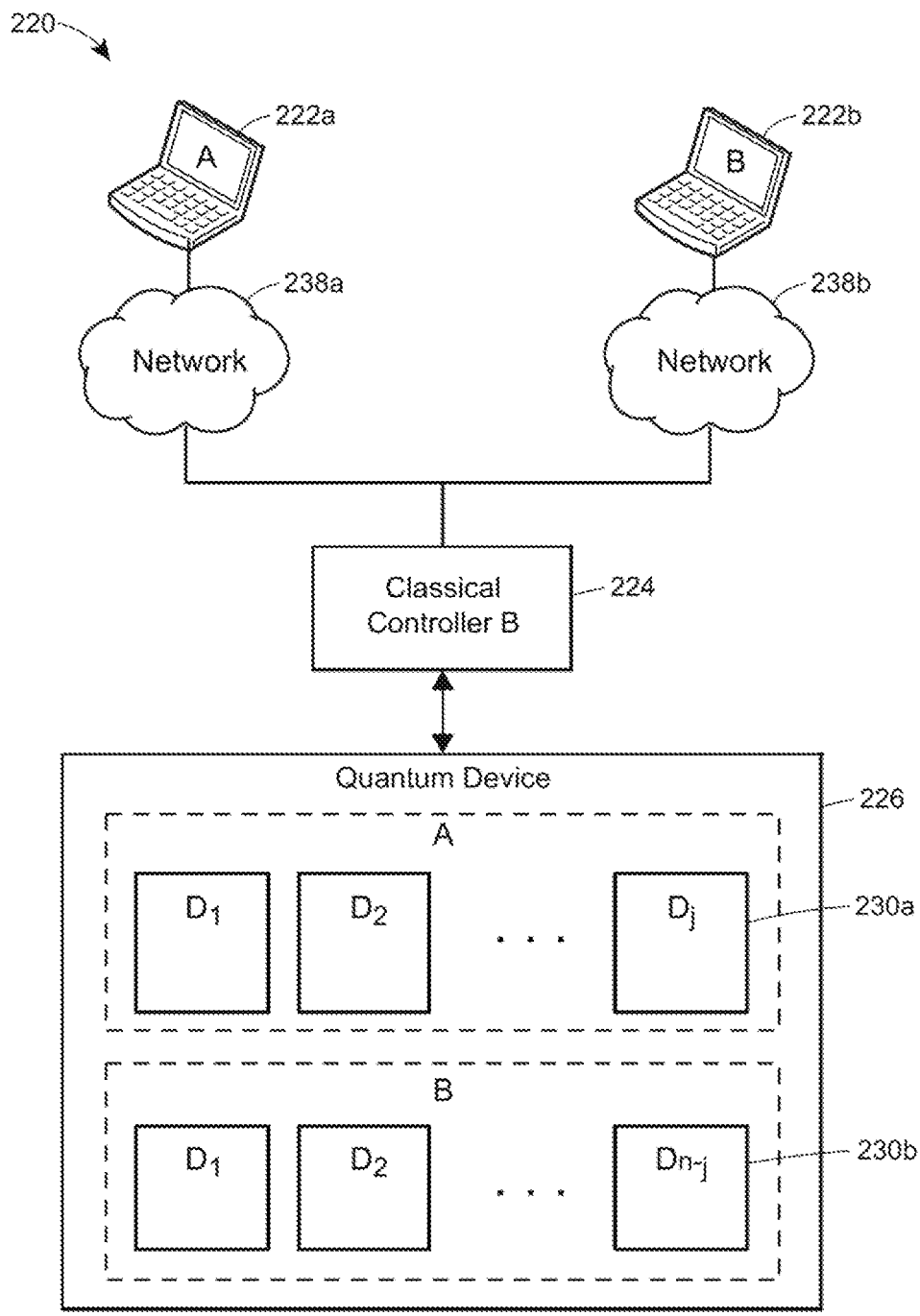
Figure 2C:
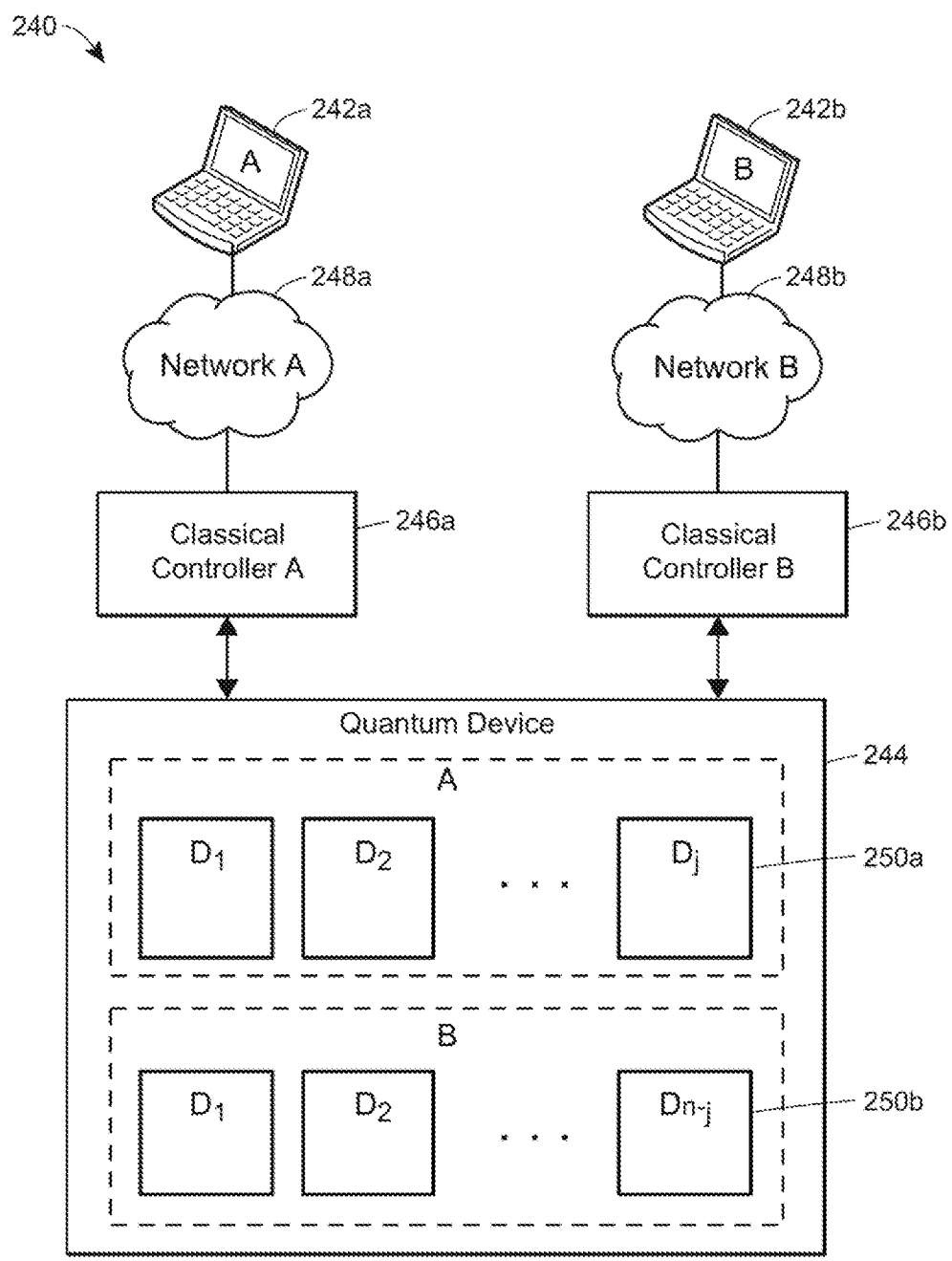

FIG. 2B is a block diagram of an example system 220 in which a network-enabled device 222a (labeled "A" in FIG. 2A) and a network-enabled device 222b (labeled "B" in FIG. 2A) may interact with a classical controller 224, where the classical controller 224 is communicatively and/or operatively connected to a quantum device 226. Similar to the system 200, each of the network-enabled devices 222a and 222b may have access to (e.g., be able to interact with via the classical controller 204) one or more quantum components 230a and 230b, respectively. As with similar quantum devices described above, the components 230a and 230b may represent physical sources of quantum randomness, for example, where each device, D, or where pairs of devices, D, execute a protocol converting a locally random input into a globally random output. Yet, in the system 220, each of the network-enabled devices 222a and 222b may communicate with the classical controller 224 via a different network. The network-enable device 222a may communicate with the classical controller 224 via a network 232a, and the network-enable device 222b may communicate with the classical controller 224 via a network 232b.

The networks 232a and 232b may be different types of networks, in an implementation. For example, the network 232a may include a wired network, and the network 232b may include a wireless network. Alternatively, the network 232a may include a private network, and the network 232b may include a public network. In general, the networks 232a and 232b may differ based on any parameters or properties, such as privacy, network type, network carrier or provider, etc. Further, communication via the networks 232a and 232b may differ based on required types of security. As such, the network-enabled devices 222a and 222b may communicate with the classical controller 224 such that a common level of security may be established (e.g., via the generation of a quantum key on the quantum device 226), and subsequent communications between the network-enabled devices 222a and 222b may adhere to security requirements of both of the networks 232a and 232b, in an implementation.

In addition to interacting with the classical controller via separate or different networks, network-enabled devices may interact with a quantum device via separate or different classical controllers, in an implementation. As in an example system 240 illustrated in FIG. 2C, network-enable devices 242a and 242b may interact with the quantum device 244 via a classical controller 246a and a classical controller 246b, respectively. The network-enabled devices 242a and 242b may be communicatively coupled to the classical controllers 246a and 246b via the networks 248a and 248b, and the network-enabled devices 242a and 242b may only interact with corresponding quantum components 250a and 250b of the quantum device 244, in an implementation. In this manner, interactions or communication with the quantum device 244 from the network-enabled devices 242a and 242b are shielded from one another. That is, the network-enabled devices 242a and 242b may perform quantum computations via the quantum device 244 independent of one another (e.g., via separate or different classical controllers and networks). As with the other described examples, the quantum components 250a and 250b may represent physical sources of quantum randomness, for example, where each device, D, or where pairs of devices, D, execute a protocol converting a locally random input into a globally random output.

Figure 2D:
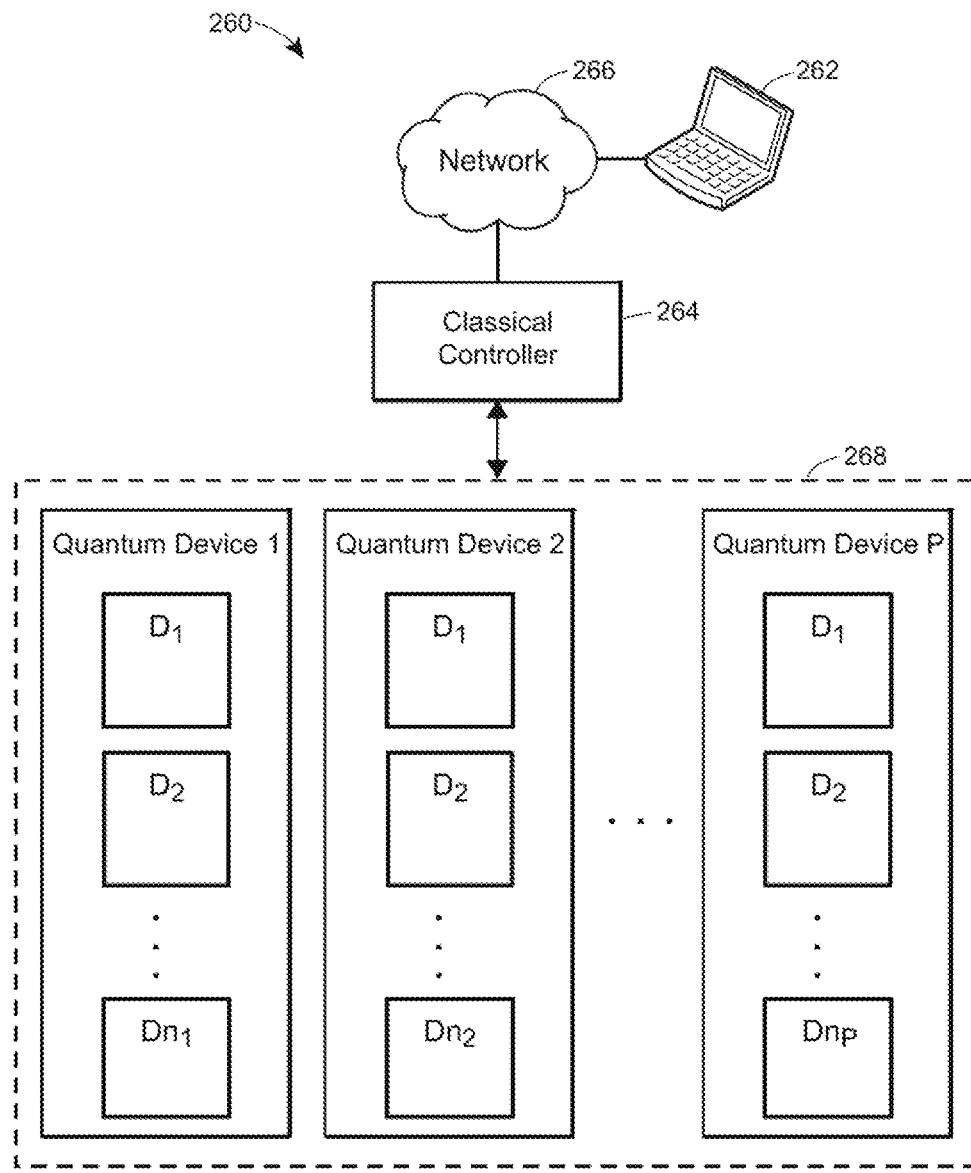

FIG. 2D illustrates still another example system 260 in which one or more network-enabled devices 262 are communicatively coupled to a classical controller 264, via the network 266, allowing interaction between the network-enabled device 262 and a plurality of quantum devices 268. The plurality of quantum devices 268 (Quantum Device 1, Quantum Device 2, . . . , Quantum Device P) may each include a plurality of quantum components ($\{D_1, D_2, \ldots, D_{n1}\}, \{D_1, D_2, \ldots, D_{n2}\}, \ldots, \{D_1, D_2, \ldots, D_{nP}\}$), and each of the quantum devices 268 may include the same or a different number of quantum components 270 (n1, n2, . . . , nP), in an implementation. The multiple quantum devices 268 may simultaneously, or otherwise, execute different algorithms, data manipulations, or protocols, or the quantum devices 268 may cooperatively execute one or more algorithms, manipulations, or protocols. For example, two or more of the quantum devices 268 may execute a protocol for unbounded randomness expansion, as further discussed with reference to FIG. 13. In some implementations, the plurality of quantum devices 268 and corresponding quantum components are isolated from one another and, in other cases, the plurality of quantum devices 268 and corresponding quantum components may be resettable allowing quantum communication between protocol iterations. In some examples, the quantum devices 268 may represent physical sources of quantum randomness, for example, where each device, D, or where groups of devices, D, execute a protocol converting a locally random input into a globally random output, as discussed herein.

Random Number Generation

Figure 3A:
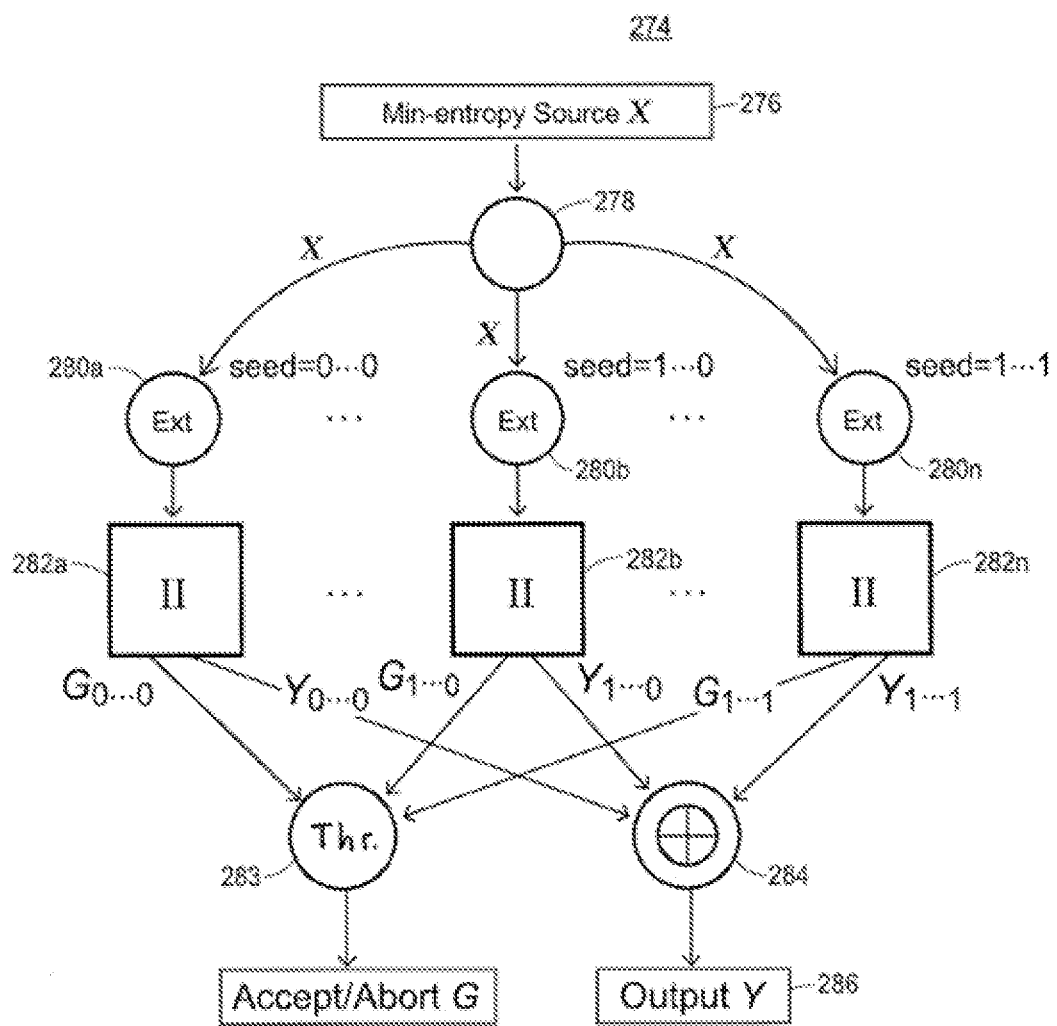
FIGS. 3A-3C illustrate example protocols for generating a random bit string using untrusted quantum devices.

FIG. 3A illustrates an example protocol 274 for generating a random number from an untrusted quantum device. In the illustrated example, a min-entropy source 276 provides an input signal X, that may be duplicated at duplicator 278. The duplicator 278 produces an exact copy of the input signal X, such that each copy may be used as an input to each of a plurality of seeded quantum-proof randomness extractors (Ext) 280a-280n. Thus, for each possible value of the extractor seed signal from the duplicator 278, there is a corresponding extractor 280a-280n fixed to receive that seed signal. Operation of the extractors 280a-280n is described further below; but generally, each extractor 280a-280n extracts a randomness from the input signal X (e.g., an input bit or input string), where at least one of the extractors 280a-280n produces an output that is locally random to all over extractors of the protocol 274.

In the illustrated example, each extractor 280a-280n produces an instance that is used as the input to a corresponding modules 282a-282n, where each module 282a-282n may be implemented as a different physical source of randomness, for example. In particular, the physical sources may be spatially separated untrusted quantum devices, for example. The modules 282a-282n each execute a protocol (also termed a sub-protocol) to convert a locally random input into a globally random output. In this way, the modules 282a-282n can be thought of a sub-protocol modules. In some examples, such as those described in reference to FIG. 5 below, the sub-protocol modules 282a-282n employ a "quantum randomness decoupling" (RD) protocol, which makes use of a untrusted quantum device and transforms an input random to the device to an output (almost perfectly) random to all systems other than the device. The "randomness decoupling" protocol is also described herein as a randomness certification protocol.

In the illustrated example, each of the modules 282a-282n includes a protocol that makes a randomness certification decision from which the module produces an accept/abort decision, $G_i$, along producing the bit output string, $Y_i$, which is the output string of the i-th instance of the randomness certification of the sub-protocol of modules 282a-282n. That is the modules 282a-282n reflect a deterministic operation as well as a quantum randomness operation. As such, while the modules 282a-282n can be implemented using physical source that includes a quantum device, the modules may be implemented partially using quantum devices and a classical controller (e.g., FIG. 1 and FIGS. 2A-2D), such as control logic, providing deterministic processes. In any event, the accept/abort decisions are provided to a decision module 283, which in the illustrated example is a stage that computes a threshold function of all decisions. In particular, the decision module 283 will accept if the percentage of the acceptances is at least some threshold $0 \leq \eta < 1$. The output bit string of the sub-protocol modules 282a-282n may be one or more random bits, which are coupled to an aggregator 284, for example, which may include an XOR gate that combines the outputs to form a final output string 286.

In the illustrated example, the extractors 280a-280n need not trust the corresponding sub-protocol modules 282a-282n, as the protocols within the modules can make a randomness accept/abort decision. As a consequence of this lack of trust, each extractor may simultaneously minimize two types of errors, the soundness error, $\epsilon_s$, that is, for accepting the output of less-than-desired quality, and the completeness error, $\epsilon_c$, that is, for rejecting the output of an honest device.

The extractors 280a-280n are quantum-secure randomness extractors, which turn a weak input source into a collection of outputs, where at least one of those outputs is near perfectly random to an adversary, but nevertheless resides in an unknown location. That is, one of the extractors 280a-280n will produce a near perfectly random bit or string, but the exact extractor may be unknown to the system 274, and as such to an adversary. To obtain the desired output randomness from this quantum-secure "somewhere randomness," the output from each extractor 280a-280n is applied to a respective quantum device employing a protocol that turns a local perfect randomness input signal into a global randomness output signal, a task we call randomness decoupling. The output of each of these protocols (of modules 282a-282n) is combined into the bit-wise XOR aggregator stage 284.

Example extractors that may be used in the system 274 include Trevisan's extractors, which have been shown to be quantum-secure by De et al. (Anindya De, Christopher Portmann, Thomas Vidick, and Renato Renner. Trevisans extractor in the presence of quantum side information. SIAM Journal on Computing, 067(258932), 2012.), which is hereby incorporated by reference. The quantum devices can be those as described below in reference to FIGS. 5-13, for example. Other suitable quantum devices include those applying Vazirani-Vidick's device independent quantum key distribution (DI-QKD) protocols and device independent randomness expansion (DI-RE) protocols described in U. Vazirani and T. Vidick, Certifiable quantum dice. Philosophical Transactions of the Royal Society A: Mathematical, Physical and Engineering Sciences, 370(1971):3432-3448 (2012) and U. Vazirani and T. Vidick, Fully device independent quantum key distribution. arXiv:1210.1810v2, (25 Nov. 2012), which are both hereby incorporated by reference. However, in contrast to these later described devices, the system 274 is configured to tolerate noise levels, assumed non-existent in theoretical systems, but that we recognize as valuable for practical systems. The present techniques, for example, suggest protocols that allow for noise levels not achievable in theoretical and conventional systems, and may be achieved when outputting only a single bit.

Random Amplification Protocol

In the illustrated example, each sub-protocol module 282a-282n exhibits a protocol IT which may be a classical algorithm interacting with an untrusted quantum device with multiple, spatially separated components. Such a protocol is a randomness decoupling, alternatively referred to as a randomness certification protocol, and its goal is to generated certified uniform randomness from any weak source with sufficient entropy, using untrusted devices. The protocol may be made to satisfy two properties: (i) "completeness" which generally provides that when the devices are "honest" (i.e., following the prescribed design) and the source has sufficient entropy, the protocol should accept with high probability and the output should be close to uniformly random, and (ii) "soundness", which generally provides when the devices are malicious, the probability of accepting their low-quality output is negligibly small. The definitions in (4.2) and (4.3) capture both properties for a random certification protocol, respectively. In particular, the protocol $\Pi$ may include a randomness certification protocol, $\Pi_{cert}$, for (n, k)-source with completeness error, $\epsilon_c$, and soundness error, $\epsilon_s$, if it satisfies the following completeness and soundness properties, respectively.

1. (Completeness) There exists a quantum-admissible strategy for devices D such that for every source X the probability that the protocol fl accepts the input signal is greater than the completeness error, expressed as:

$$Pr[\Pi(X,D) \text{accepts}] \geq 1 - \epsilon_C. \quad (4.2)$$

2. (Soundness) For every joint system $\rho_{XDE}$ of the source, devices and the environment such that $H_\infty(X|D) \geq k$, and let $\rho_{OZXE} = \phi_\Pi \otimes id_E(\rho_{XDE})$, then we have $$\Delta(\Pi, \rho_{XDE}) = \|\rho_{OZXE} - \phi^Z_{ideal}(\rho_{OZXE})\|_{tr} \leq \epsilon_S \quad (4.3)$$

The source X (e.g., source 276) need only have k bits of min-entropy conditioned on the devices, D, and not conditioned on both the devices and the environment E. This isolation of the min-entropy source gives better confidence on the amount of entropy in X that is sufficient of randomness generation using untrusted sources.

In examining (4.3), it is noted that the choice of $H_\infty(ND)$ may be extended easily to a smooth min-entropy source, $H^{\epsilon_m}_\infty(X|D)$, by allowing an extra error $\epsilon_m$ in the soundness error. That is, the present randomness generation techniques are still able to sufficiently function and produce random bit strings, within the added error tolerance, with the configurations described.

In some examples, the desired properties for a randomness amplification protocol applied by sub-protocol modules 282a-282n would be as follows. With the system 274, it is desirable to take a small amount of min-entropy k and efficiently generate a long and high-quality certified randomness (measured by output length l and soundness error $\epsilon_s$), where the efficiency can be measured by the number of devices t and the query and time complexity of the protocol Ill. Note that since the sub-protocol modules 282a-282n can generate randomness, one can expect that the output length l is larger than the investigated entropy, k, that is, to achieve expansion property. High-quality randomness is useful for some applications such as cryptography, and it is desirable to have soundness error to be poly-logarithmic in the investigated entropy k and the complexity of protocol $\Pi$.

Moreover, to implement the protocol in physical systems, robustness should be achieved, that is, a strengthening of completeness such that the protocol accepts an input with high probability even when a small constant amount of noise is present in the sub-protocol modules 282a-282n. This robustness is beneficially achieved by specifying a noise model for the protocol $\Pi$, as described, where, in some examples, the noise model is dependent, at least partially, upon the type of quantum device (i.e., physical sources) used as sub-protocol modules 282a-282n. Further examples are detailed hereinbelow in reference to FIGS. 5-13.

Randomness Certification Protocol

In addition to employing a quantum processes, the modules 282a-282n can employ a randomness certification protocol, $\Pi_{cert}$, where the goal is to certify uniform randomness produced by the devices (against the environment), based on the uniform seed. In an example, protocol Π includes a randomness certification sub-protocol with seed length n, and having a completeness error, $\epsilon_C$, and soundness error, $\epsilon_S$, that satisfies the following conditions, respectively. Again, while the values 4.2 and 4.3 may be satisfied for the protocol overall, for the randomness certification protocol, $\Pi_{cert}$, the following additional expressions for completeness and soundness may be used.

1. (Completeness) There exists a quantum-admissible strategy for devices D such that for every source X (not necessarily uniform), $$Pr[\Pi(X,D) \text{accepts}] \geq 1-\epsilon_C. \quad (4.4)$$

2. (Soundness) For every joint system $\rho_{XDE}$ of the source, devices and the environment such that $\rho_{XDE}=U_X \otimes \rho_{DE}$, and let $\rho_{OZXE}=\phi_\Pi \otimes id_E(\rho_{XDE})$, then we have $$\Delta(\Pi,\rho_{XDE})=\|\rho_{OZXE}-\phi^Z_{ideal}(\rho_{OZXE})\|_{tr} \leq \epsilon_S \quad (4.5)$$

For randomness expansion, conventional techniques require the certified randomness output is longer than the original seed input. In contrast, the present techniques do not place such limits on the randomness output. Instead, the output may be close to uniform against the environment, E, with a min-entropy seed input X, such that the entropy comes from the quantum devices disconnecting the output from the input seed input. Indeed, because the output is not limited by the size of the original seed input, the randomness certification protocol may certify just a single bit from a long seed input.

In any event, FIG. 3A demonstrates an entire randomness amplification protocol, Π or flame, for random number generation, based on an input bit or string, X, from a weak source, applying a randomness amplification protocol, $\Pi_{amp}$, to X, which includes using the extractor Ext to turn X into a somewhere random source $(S_1, \ldots, S_{2^d})$ where d is the seed length of Ext and $S_i=Ext(X, i)$, and then for each $i \in [2^d]$, applying a randomness certification protocol $\Pi_{cert}$ with seed $S_i$ and distinct set of quantum devices $D_i$, each of which outputs $(O_i,Z_i)$. If the percentage of acceptances is outside of some threshold $0 \leq \eta < 1$, then the overall protocol $\Pi_{amp}$ may reject that seed through the accept/abort decision block 283; otherwise, $\Pi_{amp}$ accepts the seed and outputs $Z=\oplus_{i \in [2^d]} Z_i$.

At a high level, $\Pi_{amp}$ relies upon the output of some extractor 280a-280n $(S_{i*})$ being close to uniform and thus can be used as the seed in $\Pi_{cert}$ which certifies that the output $Z_i$ from the modules 282a-282n is close to uniform even conditioned on everything except $D_{i*}$, which includes source X, environment E, the devices $D_{-i*}$ used by other blocks. This implies that $Z_{i*}$ is close to uniform conditioned on the outputs $Z_{-i*}$ of other blocks, and thus $Z=Z_{i*} \oplus (\oplus_{j \neq i} Z_j)$ is close to uniform.

Figure 3B:
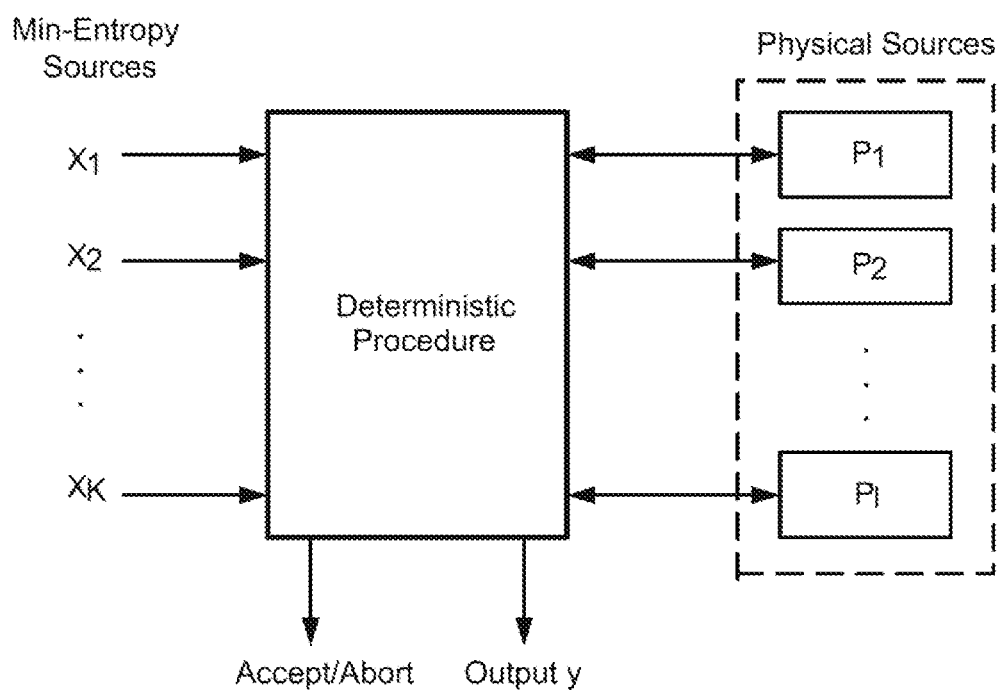
Figure 3C:
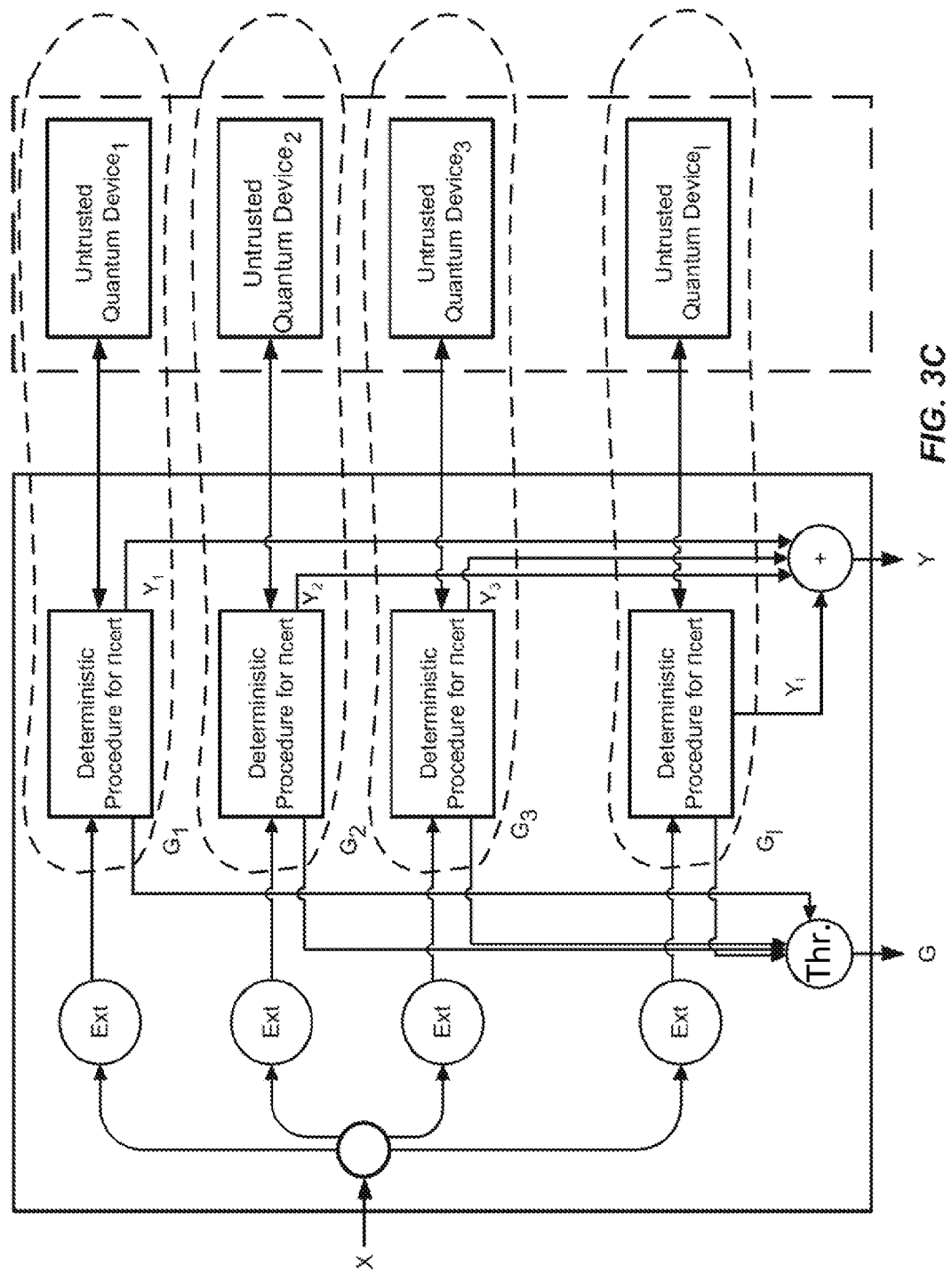

FIGS. 3B and 3C illustrate other example implementations of the techniques described herein. FIG. 3B illustrates a high level system for randomness generation, using multiple min-entropy sources coupled to a deterministic procedure classical controller, for example, comprising a processor, logic circuits, etc. described herein. The deterministic procedure is coupled to a plurality of separated physical sources each capable of provided a quantum device for quantum randomness generation. In the illustrated example, there may be one physical source, $P_I$, for each min-entropy source $X_K$. In the illustrated example, the system of FIG. 3B can receive, from each of one or more min-entropy sources, a binary input string. The deterministic procedure controller interacts with one or more input/output devices, P1, P2 . . . , PI, which are untrusted systems capable of producing global randomness from local randomness. The deterministic procedure controller will output accept/abort decision together with an output string Y, for each instance of operation of the randomness procedure. Thus in this example, the technique is able to ensure that that if P1, . . . , PI are honest implementations, then the chance of outputting an "accept" together with Y being almost perfectly random is very high. This ability to accept/abort (i.e., accept/reject) ensures a higher quality use of the output Y.

FIG. 3C illustrates a more detailed implementation of the technique in FIG. 3B instantiated in a similar manner to that of FIG. 3A. The system in FIG. 3C illustrates a single min-entropy source, a duplicator, a plurality of extractors, each coupled to a separate deterministic procedure controller that performs a sub-protocol, $\Pi_{cert}$, certification on the output of the corresponding extractor. Each deterministic procedure controller is paired with an untrusted quantum device, such as from a physical source. That quantum device converts a locally random input from the corresponding extractor and passed through the deterministic controller into a globally random output, that is provided back to the deterministic controller for output as the string, $Y_I$. The decision made by the deterministic procedure controller and specifically using the certification sub-protocol, $\Pi_{cert}$. The combined deterministic procedure controller and the paired untrusted quantum device correspond to an instances of the certification sub-protocol.

Figure 4:
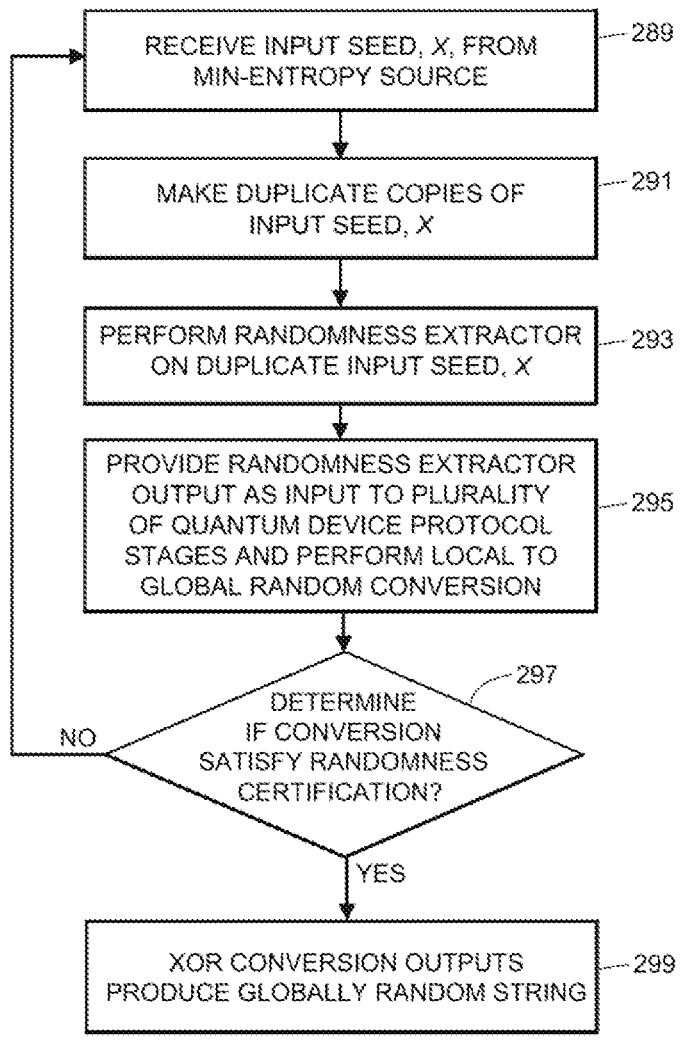
FIG. 4 is a flow diagram of an example method utilizing the protocol illustrated in FIGS. 3A-3C, where the example method can be implemented in the system illustrated in FIG. 1.

FIG. 4 illustrates an example method 287 for generating random numbers using a protocol, such as the example protocol 274 of FIG. 3A. The method 400 may be implemented in the quantum device 102, for example. Initially a min-entropy source provides an input bit or string, X, at a block 289. At a block 291, that input seed, X, is duplicated into identical copies that are provided to plurality of extractors that perform a randomness extraction on their respective copies at a block 293. Each extractor is paired with a separate quantum device protocol stage that receives, at a block 295, the output from the extractors, for converting the received output, from a locally random input string to a globally random output. At least one of the quantum device protocol stages will produce a globally random output. To determined if the output of the device protocol stage is a globally random output, a randomness certification is performed at a block 297, such that if the certification is satisfied, then control passes to a block 299 where the outputs of all the quantum device protocol stages are combined, in an XOR stage, to output the globally random output string. If the certification is not satisfied, then, the process 287 repeats for the next input string, X.

As discussed below, FIGS. 5-13 illustrate implementations using an example protocol (FIG. 5) for the quantum devices of FIG. 3A. For example each of the quantum devices may include a plurality of quantum sub-device each operating according to a non-local game in a random bit generation cycle, wherein each quantum device (i) maintains isolation among the plurality of quantum sub-devices in the quantum device during the random bit generation cycle, so that each of the plurality of quantum sub-devices of the quantum device maintains at least one of superposition or entanglement during the random bit generation cycle, and (ii) causes communication among the plurality of quantum sub-devices of the quantum device after the random bit generation cycle.

In any event, as explained, this example protocol may be used for random number generation, unbounded randomness expansion, and quantum key distribution. While the examples are discussed in reference to the protocol of FIG. 5, the present techniques may be applied with any suitable protocol implementing quantum devices. Other suitable quantum devices include those applying Vazirani-Vidick's device independent quantum key distribution (DI-QKD) protocols and device independent randomness expansion (DI-RE) protocols described respectively in (U. Vazirani and T. Vidick. Certifiable quantum dice. Philosophical Transactions of the Royal Society A: Mathematical, Physical and Engineering Sciences, 370(1971):3432-3448, 2012 and U. Vazirani and T. Vidick. Fully device independent quantum key distribution. arXiv:1210.1810v2, 2012.), both of which are hereby incorporated by reference.

Figure 5:
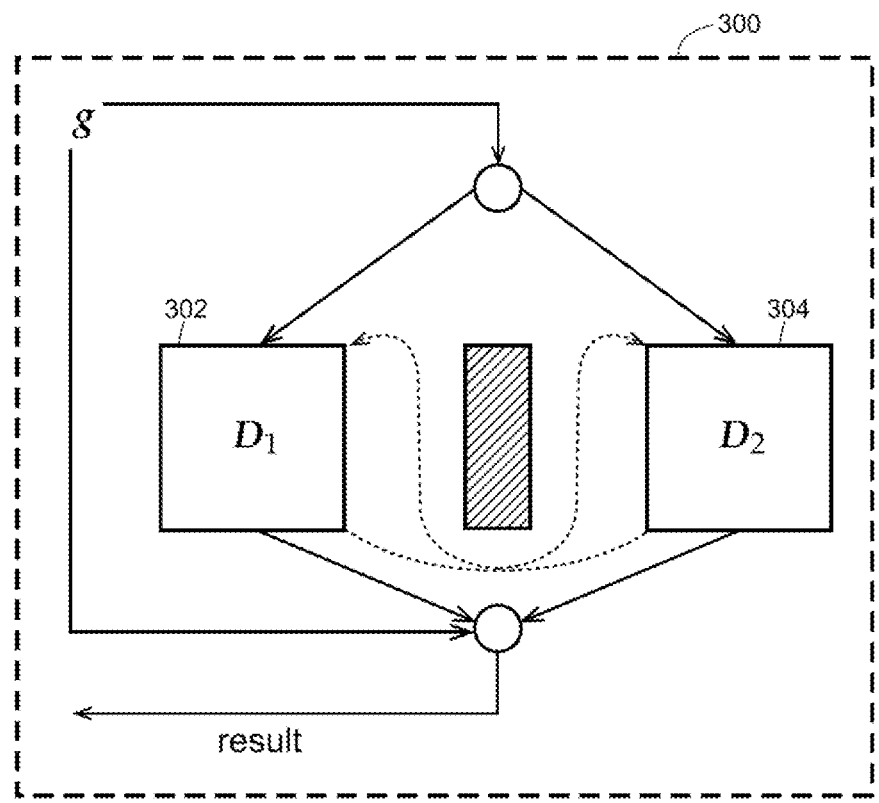
FIG. 5 illustrates an example protocol for exponential randomness expansion.

FIG. 5 illustrates an example protocol 300 for generating a random number or one bit/value of a random number. The protocol 300 is an example protocol that may be implemented by the modules 282a-282n in response to the input signal from extractors 280a-280n. The protocol 300 includes a "game," G, played by a single quantum device with n quantum components. In the particular implementation of FIG. 5, the game G is played by a quantum device with two components 302 and 304 (or "$D_1$" and "$D_2$") that may be contained within each of the modules 282a-282n. In some implementations, the components 302 and 304 are configured to be resettable allowing quantum communication between iterations of the protocol 300, while keeping the components 302 isolated during each iteration.

In some implementations the game G is a "non-local" game. Generally, non-local games may differ in scenarios in which the games are "played" by, or implemented in, systems operating according to classical mechanics as compared to scenarios in which the games are "played" by, or implemented in, systems operating according to quantum mechanics. An example non-local game is a cooperative game involving two or more players (e.g., quantum systems). The players cannot communicate but may share common random bits or a common quantum state. A controller, or other suitable device, may send an input to one of the players who then responds with an answer. Winning, in the non-local game, may include satisfying a condition dependent on the inputs from the controller (e.g., inputs from a known probability distribution).

During each iteration of the protocol 300, which iteration produces a random value or bit, the quantum device plays the game G. That is, the quantum device receives an input, g, for a single round of the game and operates such that a result is produced. G may include any binary Exclusive Or (XOR) game, such as a game with inputs and outputs are binary and with a scoring function depending on the inputs and the XOR of the outputs, where the binary XOR game is strongly self-testing, in an implementation. The game G may be strongly self-testing, or non-local in that any strategy that is close (within an value E, or E-close) to optimal in its winning probability must be $O(\sqrt{\epsilon})$-close to a unique optimal strategy in both its state and its measurements, in an implementation. In this case, the term "strongly" refers to the $O(\sqrt{\epsilon})$ term, which is the best possible asymptotic bound for a non-local game. By way of example, strong self-testing games may include the Clauser-Horne-Shimony-Holt (CHSH) game and the Greenberger-Horne-Zeilinger (GHZ) game, but it is understood that the protocol 300 may utilize any such binary XOR game. Although, strong self-testing, or non-local games are discussed above and below by way of example and for clarity, some implementations of protocols for generating random numbers may utilize other contextuality games along with or as an alternative to non-local games, as further illustrated in FIGS. 7 and 8.

The protocol 300 may include the following parameters, in an implementation: (i) N, a positive integer (e.g., the output length); (ii) η, a real $\in(0, 1]$ (e.g., the abort threshold); (iii) q, a real$\in(0, \frac{1}{2}]$ (e.g., the test frequency); (iv) G, an n-player non-local game that is a strong self-test; (v) D, an untrusted quantum device (e.g., from an untrusted party) that can play G repeatedly and cannot receive any additional information. In a single iteration (i.e., use of the protocol) the components 302 and 304 may not be allowed to communicate, but, in between iterations, there may be inter-component communication. For any real $\omega \in (0, 1)$, the protocol 300, with appropriate parameters, converts any k uniform bits to $\exp(\Omega(k^{1-\omega}))$ extractable bits with $\exp(-\Omega(k^\omega))$ error under a constant level of noise, in an implementation.

In some implementations, quantum-proof randomness extractors are applied to the outputs of the protocol 300 to produce near perfect random output from the protocol 300. The quantum-proof randomness extractors may be deterministic functions Ext(X, S) on two arguments: (i) X being the source, which in this case may be the output of the protocol 300; and (ii) S being a perfectly random seed. The extractors Ext(X, S) may, in an implementation convert any N bits X that have min-entropy Q(N) to a near perfect output randomness of length $\Theta(N)$.

Figure 6:
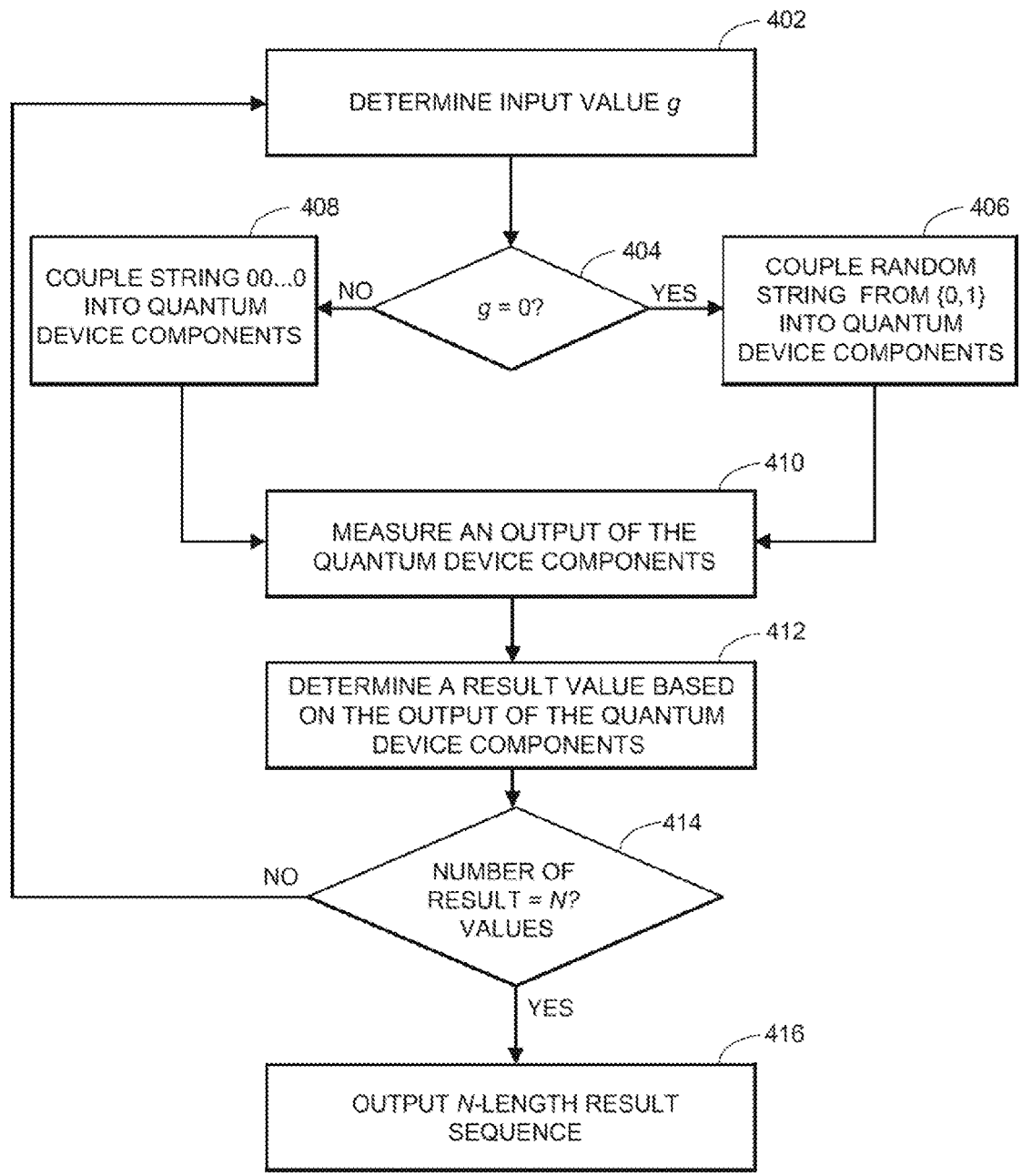
FIG. 6 is a flow diagram of an example method utilizing the protocol illustrated in FIG. 5, where the example method can be implemented in the system illustrated in FIG. 1.

FIG. 6 illustrates an example method 400 for generating random numbers using a protocol, such as the example protocol 300, as may be implemented by one of the modules 282a-282n.

To begin, a bit $g \in \{0, 1\}$ is determined (block 402). In an implementation, the bit input bit g may be determined according to a biased (1-q, q) distribution. It is understood, however, that the input bit g may be received from a random, or quasi-random (e.g., based at least partially on a deterministic function), source or determined according to any suitable distribution, as further discussed with reference to FIG. 13.

Next, it is determined if g=1 (block 404). If g=1, the iteration of the method 400 is determined to be a "game round," and an input string is determined at random (block 406). In some cases, the input string may be determined from $\{0, 1\}^n$, according a probability distribution specified by the game G, and given to a quantum device executing the method 400. On the other hand, if g=0, an input string $\{00 \ldots 0\}$ is input to components of the quantum device implementing the method 400 (block 408).

After inputting or coupling the binary input g into the components of the quantum device, the outputs of the quantum device components are measured (block 410). Depending on (i.e., based on) the measured output of the quantum device components and the rules of game G, a result value is determined and recorded (block 412). For example, in the case of a "game round," a "P" (pass) or an "F" (fail) may be recorded according to the rules of the game G. In the case of g=0, a "H" (heads) may be recorded when the output from the first component is zero; otherwise, a "T" (tails) may be recorded. In general, any type of binary, numeric, alphabetic, or symbolic result values may be determined based on the output of the quantum device components.

It is then determined if N result values have been calculated based on the procedure of blocks 402-412 (block 414). If the number of result values that have been generated is less than N, the flow reverts back to block 402 where the process of generating another result value is initiated. If the number of result values equals N, the resulting sequence of values (e.g., N-length sequence from the alphabet {P, F, H, T}) is output for subsequent storage or utilization. For example, the resulting sequence may be stored by a classical controller, such as the classical controller 104, for use as a random number or key. Alternatively, a classical controller may communicate the result sequence to a network-enabled device, such as one or more of the network-enabled devices 122.

In some implementations, a quantum device implementing the example method 400 may also determine if the "failure" rate (e.g., out of all the game rounds) exceeds $(1-w_G+\eta)$, where $w_G$ is the highest probability with which a quantum strategy can win the game G. If the failure rate exceeds $(1-w_G+\eta)$, the example method 400 may abort, restart, output an error, etc. Also, if more than 2qN game rounds have occurred, the example method 400 may abort, in an implementation.

Although the above protocol is described with reference to non-local games, the game G need not be non-local game or strong self-testing game defined in the manner described above. Generally, the game G may be a "contextuality" game, such as the game further described in "Simple test for hidden variables in spin-1 systems," A. Klyachko, M. Can, S. Binicioglu, and A. Shumovsky, *Physical Review Letters*, 101(020403), 2008. A contextuality game may be a game played by a single quantum player (e.g., quantum system), where a compatibility requirement specifies a collection of subsets of the player's quantum measurements. Those subsets of measurements must be mutually commutative, in some cases. A contextuality game G with m measurement setting includes a multilinear polynomial, f, encoding rules for the game. For example, a multilinear function:

$$f(X_1, \ldots, X_m) = \Sigma_{T \subseteq \{1,2,\ldots,m\}} f_T \Pi_{i \in T} X_i$$

satisfying $\Sigma_T |f_T| = 1$ may encode rules for a games as follows. Let D be a contextual measurement device whose set of contexts includes Supp f (that is, includes every element $T \subseteq \{1, 2, \ldots, m\}$ for which $\{|f_T|\}$. To play this example game, a subset T is chosen at random under the probability distribution $\{|f_T|\}$, and given as input to the device D. If $(b_1, \ldots, b_k)$ are output bits, the score of the game may be given by:

$$\frac{f_T}{|f_T|} \cdot (-1)^{b_1 \oplus b_2 \oplus \ldots \oplus b_k}.$$

Figure 7:
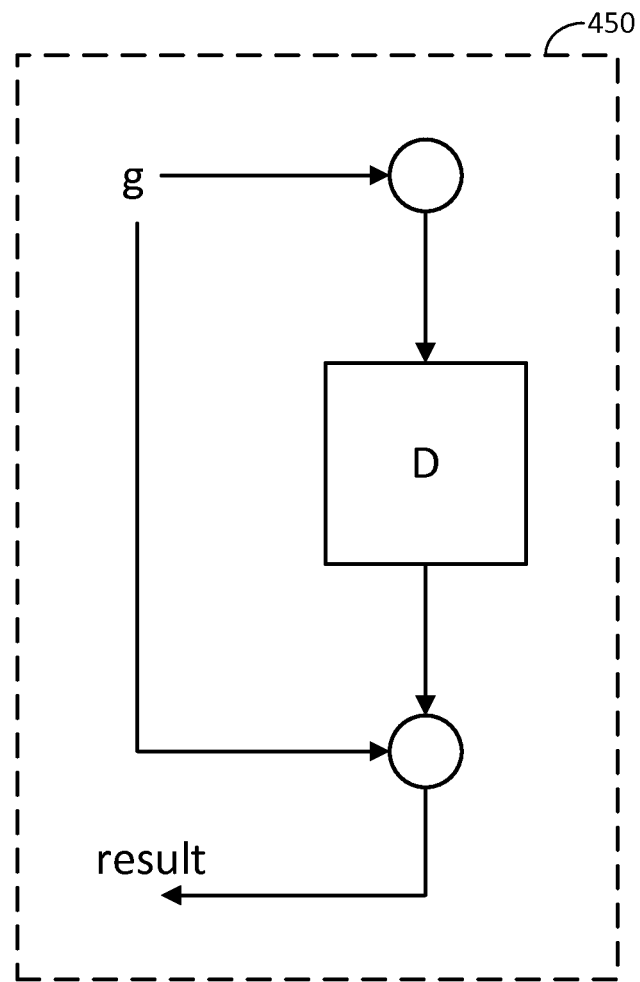
FIG. 7 illustrates another example protocol for generating a random output based on a binary input.

In fact, some protocols utilized to generate random numbers may utilize a contextuality game "played" or implemented by a single quantum system. FIG. 7 illustrates such an example protocol 450 including a contextuality game played by a single quantum system. FIG. 8 illustrates a flow of such a protocol (e.g., referred to as "Protocol K").

Generally, protocols utilized in systems, such as the example system 100, to generate random numbers may be implemented by any suitable number of quantum devices or systems and may utilize non-local games, contextuality games, or suitable combinations of these games. The above described protocols 300 and 450 are examples of such protocols. For further clarity, a general or abstract protocol describing both of these example protocols 300 and 450 is illustrated in FIG. 9. When the protocol illustrated in FIG. 9 utilizes a non-local game (e.g., a binary XOR game), the protocol may reduce to the example protocol 300, and, when the protocol illustrated in FIG. 9 utilizes a contextuality game, the protocol may reduce to the example protocol 450. In any event, protocols 300 and 450 may have security guarantees for all noise levels that are within a maximum noise level (e.g., when the devices implementing the protocols 300 and 450 cease to output randomness).

Randomness Expansion

For clarity, certain quantities that may describe properties of randomness expansion protocols of the current disclosure are discussed briefly below. A Classical-Quantum (C-Q) state may be considered ideal with y (a positive integer) extractible bits if the first bit of the classical part indicates "Success" or "Failure", and conditioned on Success, the C-Q state has conditional min-entropy$\geq y$.

A randomness expansion protocol may have a yield y with soundness error $\epsilon_s$ if for any device D, the output is always within trace distance $\epsilon_s$ of an ideal state with y extractible bits. The protocol may tolerate a noise level A with completeness error $\epsilon_c$ if any device that plays each game independently with an expected score no less than $(w_G-\lambda)$ will abort with probability at most $\epsilon_c$. If both the soundness and the completeness errors are $\leq \epsilon$. The "error" of the protocol may be referred to simply as $\epsilon$. Note, that, in an implementation, $\epsilon_s$, $\epsilon_c$, $\lambda$ may be reals in (0, 1).

The implementation of FIG. 5 may use soundness and completeness errors as follows, where these errors satisfy the randomness amplification protocols and randomness certification protocols described above. For any strong self-test G, and any $\delta > 0$, there may exist positive constants $g_0$, $\eta_0$, $N_0$, b, c, such that the following holds when a randomness expansion protocol of the current disclosure is executed with parameters $q \leq q_0$, $\eta \leq \eta_0$, and $N \geq N_0$:

1. (Soundness.) The yield may be at least $(1-\delta)N$ extractible bits with a soundness error $\epsilon_s = \exp(-bqN)$.

2. (Completeness.) For any constant $\lambda$, $0 < \lambda < \eta$, the protocol may tolerate a noise level of $\lambda$ with a completeness error $\epsilon_c = \exp(-c(\eta-\lambda)2qN)$.

Note, input bits $g_1, \ldots, g_n$ may be generated by $O(Nh(q))$ uniformly random bits with an error $\exp(-\Omega(qN))$, where h denotes the Shannon entropy function. Therefore, when q is chosen to be small, a randomness expansion protocol may need only $\omega(\log N)$ initial bits and one device to achieve $\Omega(N)$ extractible bits with negligible error.

For any real $\bullet \in (0, \mu)$, a randomness expansion protocol with appropriate parameters may convert any k uniform bits to $\exp(\Omega(k^{1-\omega}))$ near uniform bits with $\exp(-\Omega(\omega))$ error under a constant level of noise. Once a near perfect random output is generated, the output may be utilized as the input to another instance of the protocol, thus expanding further with an accumulating error parameter. As the error parameters decrease at an exponential rate, they may be dominated by the first set of errors.

Figure 10:
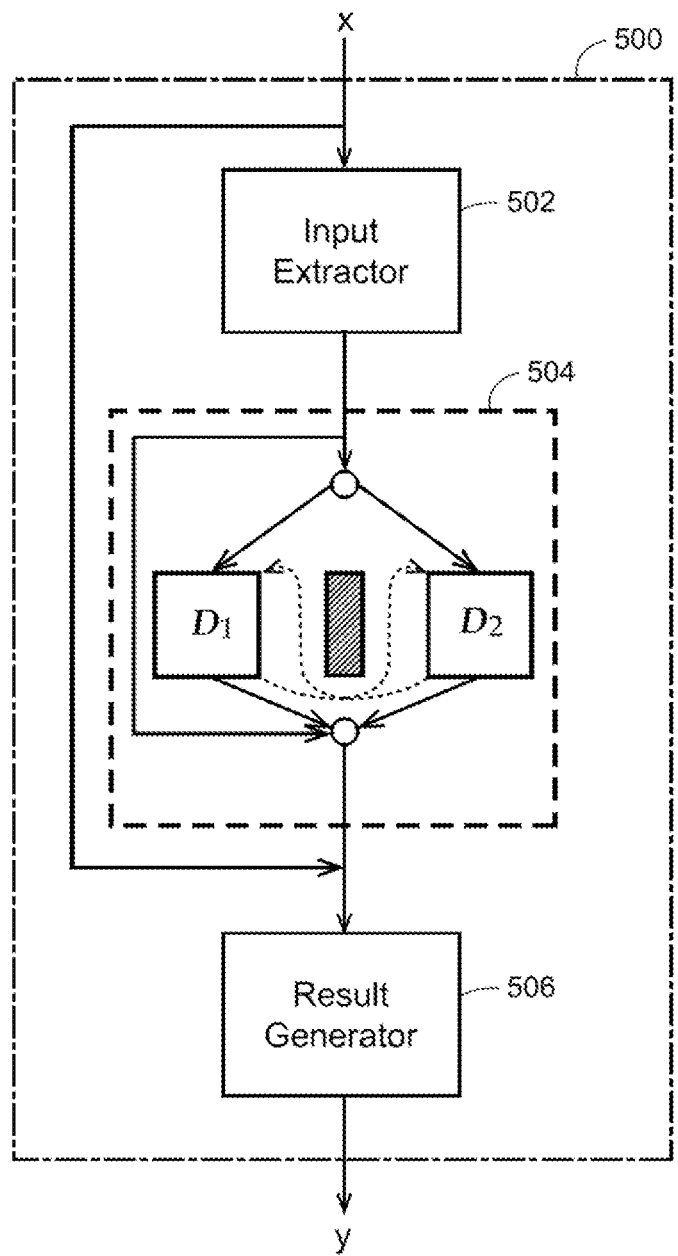
FIG. 10 illustrates an example protocol for exponential randomness expansion.

FIG. 10 illustrates an example randomness expansion protocol 500 as may be implemented with the configuration 274 applying quantum devices employing the protocols of FIG. 5. The protocol 500 may receive as input a source X of random bits; which are provided by a trusted party and part of which may be preprocessed to be compatible with certain chosen parameters. By way of example, the chosen parameters may include desired output length, output randomness quality, failure probability, and the noise level tolerated. A user of a classical controller or network-enabled device may choose these parameters, in an implementation.

An input extractor 502 of the protocol 500 may obtain an input bit g from a portion of X. The portion of X from which g is obtained may include a preprocessed portion of X, in an implementation. Then, the input extractor 502 may obtain m bits x either from the source X when g is one, or m bits of 0 otherwise. These m bit may then be passed from the input extractor 502 to m quantum components of a quantum device, such as the quantum device 102, to play the game G, as illustrated in the box 504. The protocol 500 may also include an output determination and randomness extraction 506 which outputs result values, from the game G, based on the output of the quantum components playing the game G and the input x. Note, although the box 504 is illustrated as a protocol utilizing a non-local game, the box 504 may be replaced with a protocol utilizing a contextuality game, as described further with reference to FIGS. 5 and 6.

Figure 11:
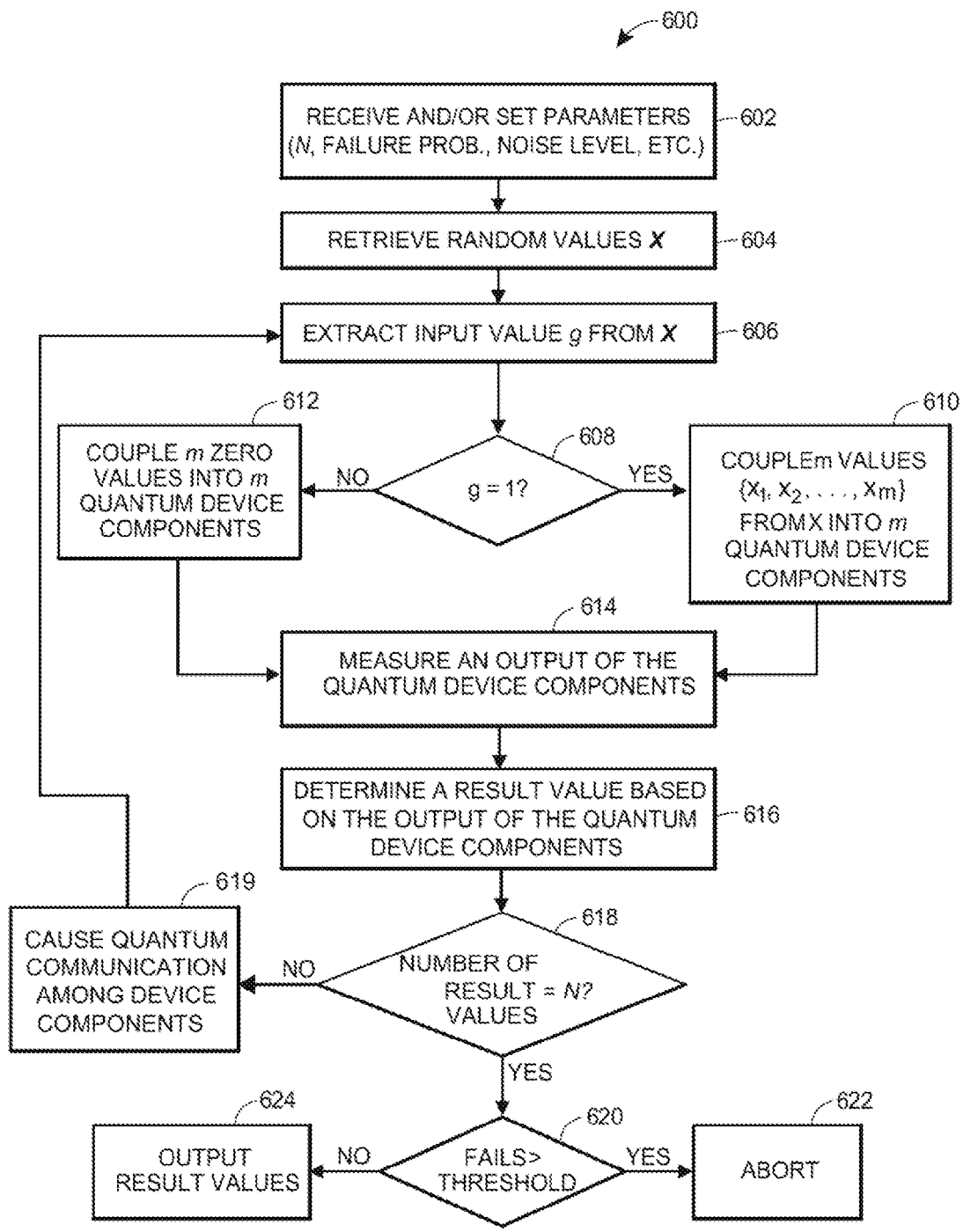
FIG. 11 is a flow diagram of an example method utilizing the protocol illustrated in FIG. 10, where the example method can be implemented in the system illustrated in FIG. 1.

FIG. 11 is a flow diagram of an example method 600 for randomness expansion as may be implemented with the configuration 274 applying quantum devices employing the protocols of FIG. 5. The method 600 may utilize the protocol illustrated in FIG. 10 and may be implemented by the classical controller 104 and quantum device 102, for example.

To begin, parameters for the randomness expansion are received and/or set (block 602). The parameters for the randomness expansion may include desired output length (N), output randomness quality, failure probability, and the noise level tolerated, as discussed above. In some implementations, these parameters are programmed into or determined by executing computer-readable instructions stored in the memory of a classical controller, such as the classical controller 104. Alternatively, a user or operator may set the parameters via manual interaction with a user interface (keyboard, touchscreen, mouse, etc.) operatively connected to a classical controller or network-enabled device. By way of example, the parameters may be selected, chosen, or set according to security requirements for the generation of random numbers, and/or the parameters may be selected to provide an appropriate balance between realistic tolerances or failure rates and desired output properties. In some cases, the received or set parameters allow the rate of randomness expansion and/or the number of output bits as a function of the number of input bits to range between a linear function and an exponential function.

Next, random values are received from a source X (block 604), and an input extractor extracts one or more input values g from X. In some cases, the input extractor extracts g from a preprocessed portion of X. If the input value g=1 (as determined at block 608), m values $\{x_1, x_2, \ldots, x_m\}$ from X are coupled into the m components of the quantum device executing the method 600 (block 610). However, if the input value g=0, m zero values are coupled to the m components of the quantum device (block 612).

After the m values are coupled to the quantum device and the device plays the game G, such as the game 504, an output is measured from the m quantum device components (block 614). For example, an output may be measured via the output interfaces 110a-110n controlled via the classical controller 104. The measurements of the output may include measurements of any suitable quantum-mechanical properties representing data within the method 600, such as charge, spin, etc.

One or more result values are then determined based on the measured output from the quantum device components (block 616). For example, a raw output bit z may be determined and recorded (e.g., by a classical controller) as the result of the game. In some implementations, the raw output bit may equal one for winning and zero for losing, according to the scoring rule of the game G, the observed output of the quantum device, and the input x.

Subsequent to the determination and recording of the output bit or result value, it is determined if the number of result value generated thus far is equal to the desired output length, N (block 618). If less than N result values have been generated, the flow reverts to block 606 where the generation of further result values is initiated.

Otherwise, if N result values have been generated, the flow continues to block 620, where it is determined if a number of failures of the method is greater than a threshold. In some implementations, this determination includes determining if the number of failed game plays among those with g equal to one (e.g., game rounds) exceeds the threshold parameter received or set in block 602. In some cases, the quantum device executing the method 600 satisfies an uncertainty principle that ensures that the quantum devices either fails the game G or has high quality output randomness. If the number of failures is greater than the threshold, the flow may continue to block 622, where the method aborts. However, if the number of failures is less than the threshold, the flow continues to block 624, where result values are output.

In some implementations, the result values generated via the above procedure are output to a known quantum-secure strong randomness extractor and back to the source X to supply the required random seed for the extractor. In such a case, the output of the extractor may be the final output y of the example method 600.

Unbounded Randomness Expansion

Figure 12:
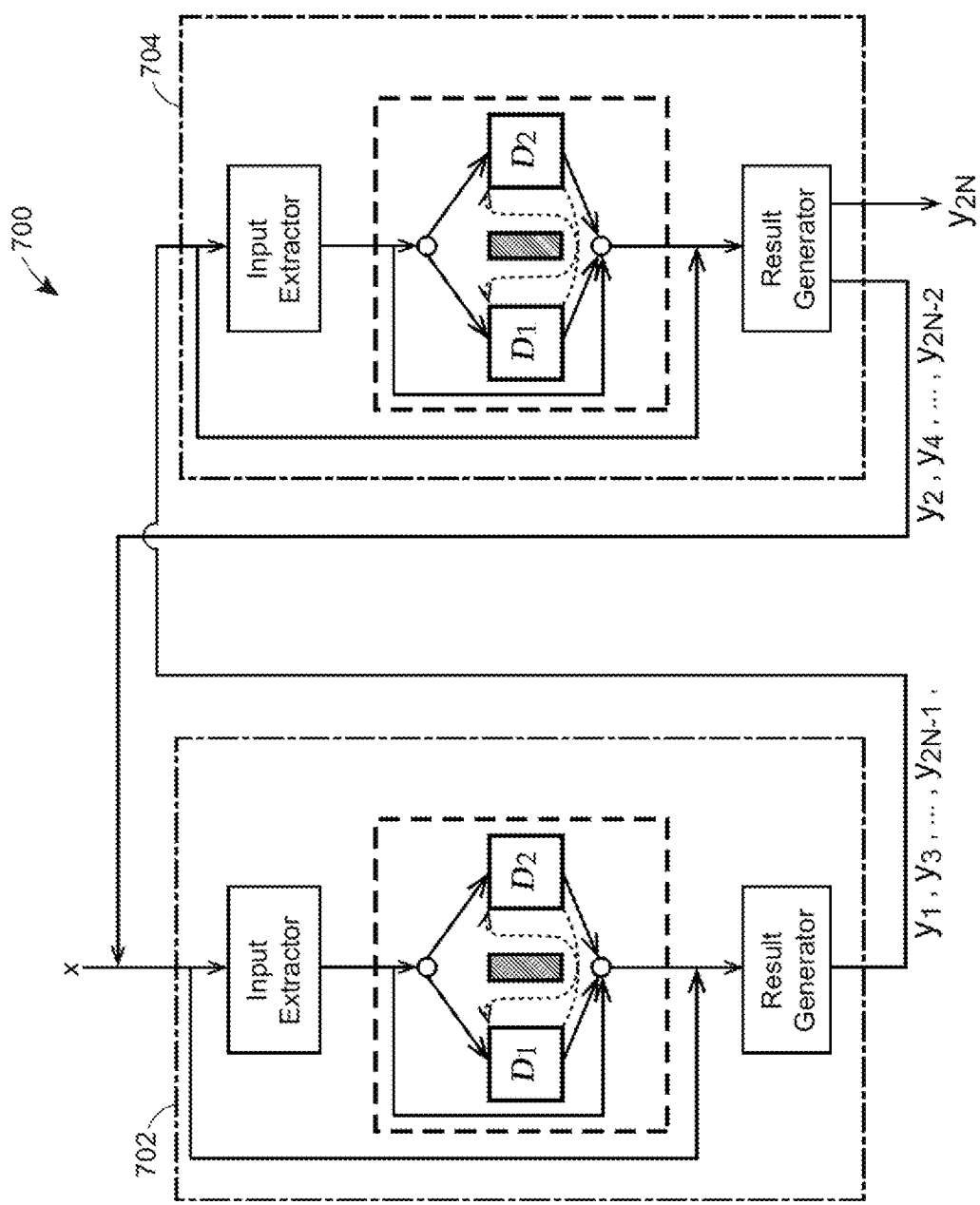
FIG. 12 illustrates an example protocol for unbounded randomness expansion.

FIG. 12 illustrates an example protocol 700 for unbounded randomness expansion as may be implemented with the configuration 274 applying quantum devices employing the protocols of FIG. 5. According to the protocol 700, for all integers N and k and any real $\omega \in (0, \mu)$, k uniformly random bits can be expanded to N output bits with $\exp(-\Omega(k^\omega))$ error under a constant level of noise. The protocol 700 may use O(log*N) iterations of randomness expansion protocols 702 and 704, such as the example protocol 500, executed on two or more multi-component quantum devices, such as the plurality of quantum devices 268.

That the O(log*N) iterations of the randomness expansion protocol 702 require only two quantum devices, in some implementations. This utilization of only two quantum devices may be based on the fact that when the input to a randomness expansion protocol is independent of the device but not necessary the adversary. The output of the randomness expansion protocol may still be as good as it would be had the input been perfectly random to both the device and the adversary.

Figure 13:
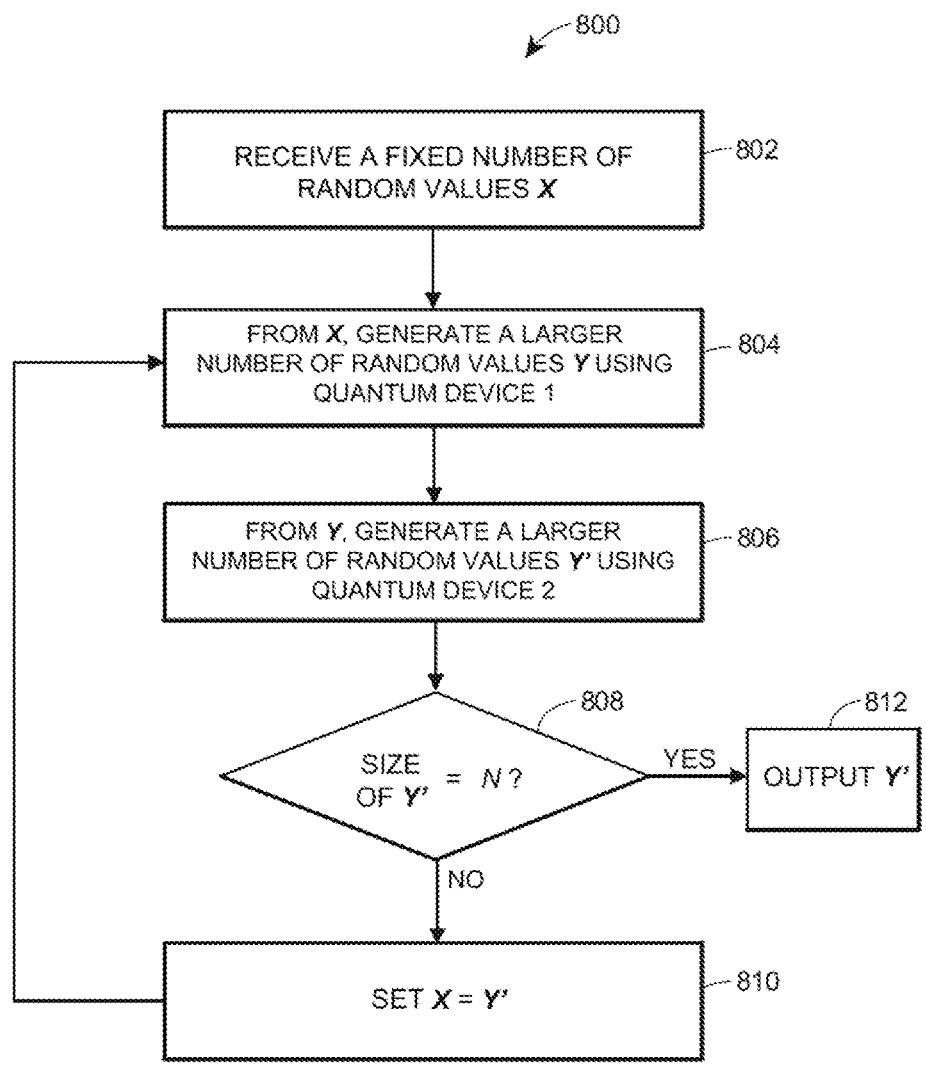
FIG. 13 is a flow diagram of an example method for quantum key distribution that can be implemented in the system illustrated in FIG. 1.

FIG. 13 is a flow diagram of an example method 800 for unbounded randomness expansion as may be implemented with the configuration 274 applying quantum devices employing the protocols of FIG. 5. The method 800 may utilize the example protocol 700 and may be implemented by the classical controller 264 and two or more of the plurality of quantum devices 268, for example.

A fixed number of random values X is received (block 802). The fixed number of random values may be obtained from a trusted source of random values, in an implementations, as discussed further with respect to FIGS. 7 and 8. The fixed number of random values X may contain any number of random values, such as one, two, three, four, etc. In some cases, a first of the quantum devices implementing the method 800 may receive the random values X from a classical controller, such as the classical controller 104.

Subsequently, the first of the quantum devices implementing the method 800 generates a number of random values Y (block 804), where the number of random values corresponding to Y is greater than the number of random values corresponding to X. The number of random values Y may be exponentially greater than the number of random values X, depending on parameters of the randomness expansion protocol utilized by the method. However, it is understood that the random values Y may be greater in number than the random values X in any suitable manner, such as greater in number by a fixed number, linearly greater in number, etc.

Next, the random values Y are input into a second of the quantum devices implementing the method 800 such that the second of the quantum devices generated random values Y', where the number of random values corresponding to Y' is greater than the number of random values corresponding to Y. As above Y' may be greater in number than the random values Y in any suitable manner. Further, the first and second of the quantum device may implement the same or different randomness expansion protocols and generate increasing random number values at different expansion rates. In some cases, however, the first and second of the quantum devices may implement similar protocols and expand randomness at similar rates.

It is then determined if the number of random values Y' is greater than or equal to N (block 808), the desired output length of desired number of output/result values. If the output is of the desired length, the result values Y' are output for utilization or further manipulation (block 812). For example, the output values may be communicated to the classical controller 264 and/or the network-enabled device 262.

If the number of random values Y' is less than N, the flow continues to block 810, where Y' is relabeled as X. Then the flow reverts to block 804, where the new input X (or Y') is utilized as input to the first of the quantum devices. As illustrated in FIG. 10, such a protocol may iterate 2N times (each Y labeled as $\{Y_1, Y_3, \ldots, Y_{2N-1}\}$ and each Y' labeled as $\{Y_2, Y_4, \ldots, Y_{2N-2}\}$), where the output of a first randomness extraction protocol 702 is input to a second randomness extraction protocol 704 and the output of the second randomness extraction protocol 704 is input to the first randomness extraction protocol 702.

In some cases, a first and second quantum device implementing the method 800 may be isolated from one another, even if corresponding components of each of the devices may be internally resettable. For example, a quantum device executing the first randomness extraction protocol 702 may be isolated from a quantum device executing the second randomness extraction protocol 704.

In the illustrated example, N is determined for the method 800. In other examples, N may be determined during operation of the method 800, for example, to allow for unbounded expansion until an external decisional control (such as from a classical controller 264), concludes the expansion process.

Quantum Key Distribution

The above-discussed protocols for random number generation and randomness expansion may be applied to untrusted-device quantum key distribution (QKD) between two example parties Alice and Bob (e.g., the network-enabled devices 202a and 202b, respectively), in an implementation. Alice may interact with a first component of a quantum device, while Bob may interact with all the other components of the quantum device. Alice and Bob may share randomness for executing a protocol, as well as randomness for later stages of information reconciliation and randomness extraction.

In some implementations, Alice and Bob use a public channel to compare their device outputs (e.g., the network 208) for those game rounds, or protocol iterations, in which an input bit g is one. Once a QKD protocol succeeds, Alice and Bob may apply a standard post-processing method to obtain a shared near uniformly random key.

Figure 14:
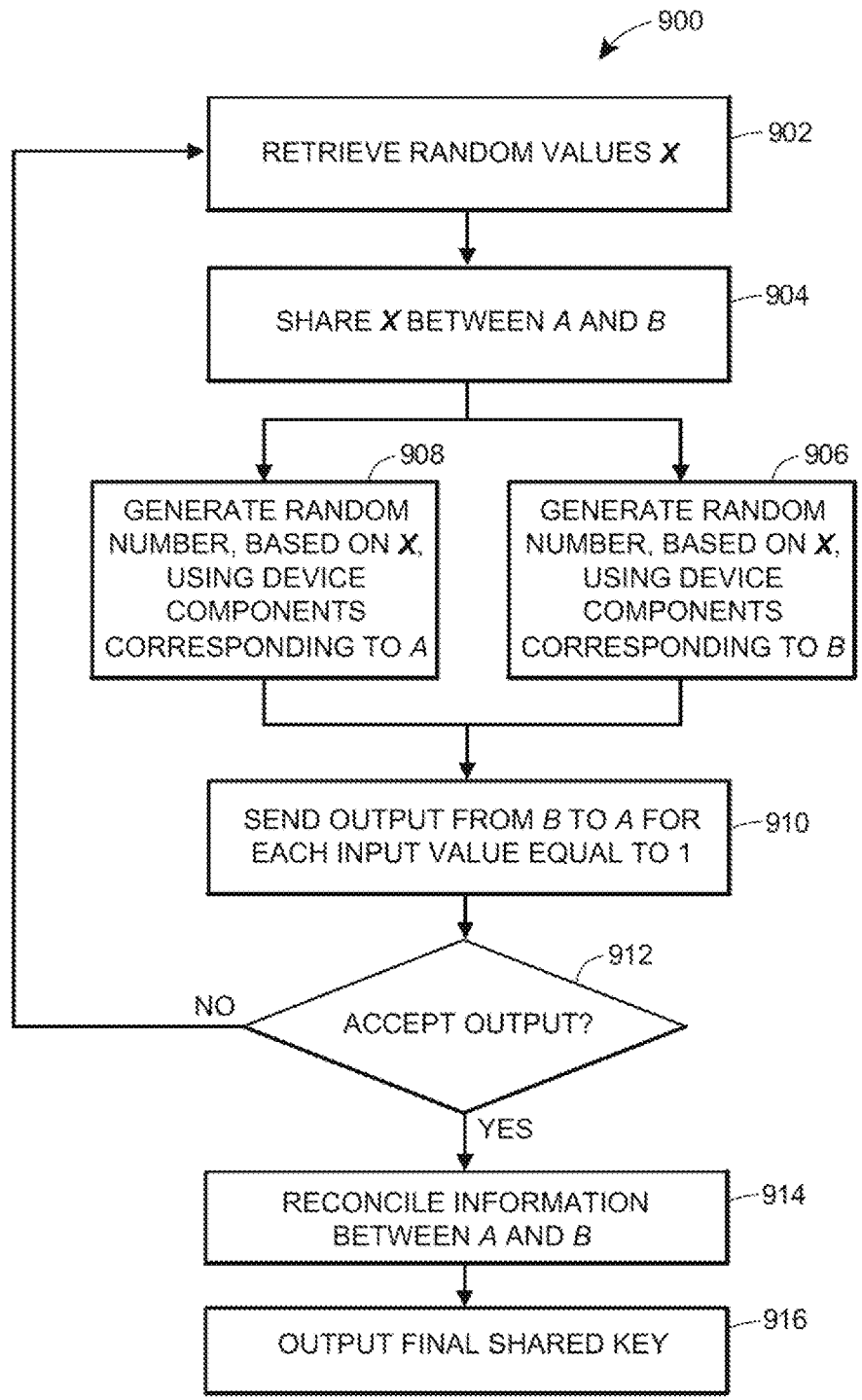
FIG. 14 illustrates another example protocol for generating a random output based on a binary input.

FIG. 14 illustrates an example method 900 for quantum key distribution based on the random number generation and/or randomness expansion discussed above, and as may be implemented with the configuration 274 applying quantum devices employing the protocols of FIG. 5. The method may be implemented in the example system 100 or one of the example systems 200, 220, or 240, for example. Alice and Bob, as described above, will be referred to as party A and party B below. It is understood, that party A and party B may include any suitable network-enabled devices, such as those discussed with reference to FIG. 1.

To begin, a party A and a party B retrieve or receive random values X (block 902). The party A and the party B may retrieve X from a trusted source of random numbers, and in some cases only one of the parties A and B retrieve X. For example, a one of the parties A and B initiating communication with the other of the parties A and B may retrieve the random values X, or vise versa.

The random values X are then shared between the parties A and B (block 904). In some implementations, this sharing may involve a message from party A to party B, or vise versa, and, in other example cases, the source of the random values X may simply send the same random values to both of the parties A and B.

After sharing the random values X the parties A and B each generate a random number, based on X, using the quantum device components corresponding to party A and the party B, respectively (blocks 906 and 908). In an implementation, the parties A and B may utilize one of the example protocols 300, 500, or 700 to generate the random number. However, each of the parties A and B may utilize any suitable combination of protocols similar to the protocols 300, 500, and 700 to generate a random value or sequence of random values.

The output (e.g., measure output) of the quantum components corresponding to party B is then communicated with party A. In some implementations, only the output corresponding to "game rounds" (e.g., g=1) is communicated from party B to party A. The communication may be a classical communication and may include electronic communication via one or more private or public networks.

Next, it is determined if the output from the quantum components is to be accepted (block 912). In some implementations, only one of the parties A and B, such as party A, determines if the output from the quantum components is to be accepted. The determination may be based on any type of pre- or otherwise determined parameters, such as failure rates, thresholds, etc., as discussed further with respect to FIGS. 7 and 8. If the output is determined to not be acceptable, the flow may revert to block 902 to restart the method 900, or the method 900 may abort (not shown).

If the output from the quantum components is accepted, the flow continues to block 914 where information is reconciled between the parties A and B. The reconciliation may include a known method for information reconciliation, in an implementation. Next, a final shared key is output based on the output of the quantum components corresponding to both party A and party B (block 916). The final shared key may be output to the devices corresponding to the parties A and B and/or to other computing devices or network components storing security information or granting access or communications permissions.

FIG. 14 illustrates an example method by which two entities communicating over a public network may work together, each offering a different quantum system, to construct a random quantum number that is unbounded in comparison to the input number, and which is not discernable to an eavesdropper on that public network. The size of that quantum number can be predetermined by the entities prior to expansion or may be determined, during operation, as the entities exchange input information.

Further Descriptions Related to Example Protocols

Further proofs, theorems, corollaries, definitions, protocols etc. relevant to the protocols, techniques, systems, and methods described above are presented below. These proofs, theorems, corollaries, and definitions are provided by way of example and clarification. Some or all of the quantum systems, protocols, etc. discussed above in the example methods and systems may utilize and/or adhere to some or all of the proofs, theorems, corollaries, and definitions. However, any suitable quantum systems as described above may implement the methods, described herein, for generating random numbers, expanding randomness, and/or distributing quantum keys.

Some of the proofs and theorems depend on the quantum Renyi entropies. For any $\alpha > 1$, and any density matrix p and any positive semidefinite operator $\sigma$, let:

$$d_\alpha(\rho \| \sigma) = Tr\left[\left(\sigma^{\frac{1-\alpha}{2\alpha}} \rho \sigma^{\frac{1-\alpha}{2\alpha}}\right)^\alpha\right]^{\frac{1}{\alpha-1}}$$

and let $D_\alpha(\rho\|\sigma) = \log_2 d_\alpha(\rho\|\sigma)$. (The quantity $D_\alpha(\rho\|\sigma)$ is called the Renyi divergence.). The $\alpha$-Renyi entropy $H_\alpha(A|E)$ of a bipartite quantum system (A, E) is computed by the maximum of the value $[-D_\alpha(\rho\|\sigma)]$ over all operators a that are of the form the form $\sigma = I_A \otimes \sigma'$, where $Tr(\sigma')=1$. The quantum Renyi entropies have a number of interesting properties. For the purposes presented here, they are interesting because if (A, E) is a classical quantum system, any lower bound on the Renyi entropy of (A, E) provides a lower bound on the number of random bits than can be extracted from A.

An Uncertainty Principle for Renyi Entropy

Suppose that Q is a qubit, and E is a quantum system that is entangled with Q. Let $\rho$ be a density operator which represents the state of E. Let $\{\rho_0, \rho_1\}$ and $\{\rho_+, \rho_-\}$ represent the states that arise when Q is measured along the $\{0, 1\}$-basis and the $\{+, -\}$-basis. We prove the following:

Theorem. There is a continuous function $\Delta: [0, \frac{1}{2}] \to \mathfrak{R}$ satisfying $\Delta(0) = 0$ such that the following holds. For any operators $\rho_0, \rho_1, \rho_+, \rho_-$ representing states arising from anti-commutative measurements, if $$\delta = \frac{Tr(\rho_1^{1+\varepsilon})}{Tr(\rho^{1+\varepsilon})},$$

then $$\frac{Tr(\rho_+^{1+\varepsilon} + \rho_-^{1+\varepsilon})}{Tr(\rho^{1+\varepsilon})} \le 2^{-\varepsilon(1-\Delta(\delta))}$$

The above theorem asserts that if the quantity $\delta$ determined by the $\{0, 1\}$ measurement is small, then the outcome of the $\{+, -\}$-measurement must be uncertain (as measured by the $(1+e)$-Renyi divergence). This parallels other uncertainty principles that have been used in quantum cryptography. The proof of this result is based on a known matrix inequality for the $(2+2\varepsilon)$-Schatten norm.

Certifying Randomness from a Device with Trusted Measurements

Say that a device with trusted measurements D is a single-part input-output device which receives a single bit as an input, and, depending on the value of the bit, performs one of two perfectly anti-commutative binary measurements on a quantum system. The measurements of the device are trusted, but the state is unknown.

Also, suppose that we make the following modifications to the procedure that defines a protocol similar to the protocol discussed with reference to FIG. 5 (referred to herein as Protocol "R"):

1. Instead of a multi-part binary device, we use a single-part binary device with trusted measurements.
2. Instead of playing a nonlocal game, at each round we simply use the bit g as input to the device and record the output.

This protocol is referred to herein as "Protocol A." (See FIG. 15)

Note that Protocols A and R both involve conditioning on a "success" event. One of the central difficulties found in establishing quantum security is in determining the impact that this conditioning has on the randomness of the device D. In the classical security context, one can show that once we condition on the success event, "most" uses of the device D (in an appropriate sense) generate random outputs. By elementary arguments, the outputs therefore accumulate min-entropy linearly over multiple iterations, and randomness expansion is achieved.

A successful way to interpret the success/abort events in the quantum context may involves two adjustments to the classical approach outlined above. First, the quantum Renyi entropy is used in place of the smooth min-entropy. (The quantum Renyi entropies have elegant arithmetic properties which make them more amenable to induction.) Secondly, rather than directly considering "success" and "abort" as discrete events, a graded measurement of performance interpolates between the two.

Suppose that E is a quantum system which is initially entangled with D. For the purposes of this discussion, assume that E and D are maximally entangled and the state $\rho = \rho_E$ is totally mixed. Then, the state of E after one iteration can be expressed as $$\bar{\rho} := (1-q)\rho_+ \oplus (1-q)\rho_- \oplus q\rho_0 \oplus \rho_1.$$

Suppose that the randomness of a state is measured with respect to a second party who knows the value of the bit g. Then, an appropriate measure of randomness may be the Renyi divergence $d_\alpha(\rho\|\sigma)$ with respect to the operator $\sigma := (1-q)I \oplus (1-q)I \oplus qI \oplus qI$. For the parameter $\alpha$, it turns out that simply taking $\alpha = 1+q$ is useful.

Then, $$d_{1+q}(\bar{\rho}\|\sigma) = Tr[(1-q)p_+^{1+q} + (1-q)p_-^{1+q} + q\rho_0 + q\rho]^{1/q}.$$

One could hope that this quantity is strictly smaller than $d_\alpha(\rho\|\sigma)$, but this is not always so (for example, for measurements on a maximally entangled Bell state). But consider instead the modified expression:

$$Tr\left[(1-q)\rho_+^{1+q} + (1-q)\rho_-^{1+q} + q\rho_0 + \left(\frac{1}{2}\right)q\rho\right]^{1/q}$$

Theorem 2.1 implies that this quantity is always less than $C^{-1}d_{1+q}(\rho\|\sigma)$, where $C > 1$ is a fixed constant. (Essentially, this is because if the quantity $\delta$ is large, then the introduction of the (½) coefficient lowers the value of the expression significantly, and if δ is small, then the desired bound is implied).

If, $$\sigma := (1-q)I \oplus (1-q)I \oplus qI \oplus 2^{(q^{-1})}qI,$$

then $d_{i+q}(p\|\sigma)$ is equal to:

$$Tr\left[(1-q)\rho_+^{1+q} + (1-q)\rho_-^{1+q} + q\rho_0 + \left(\frac{1}{2}\right)q\rho\right]^{1/q}$$

One can think of the function $d_{i+q}(p\|\sigma)$ as an error-tolerant measure of performance. The presence of the coefficient $2^{q^{-1}}$ compensates for the loss of randomness when the device-failure quantity $Tr[p_1^{1+q}]$ is large.

Now let B denote the output register of Protocol R, and let $\Lambda_{BE}$ denote the joint state of E and B at the conclusion of the protocol. Let $\Sigma$ be an operator on BE defined by:

$$\sum = \sum_{b \in \{H,T,P,F\}^N} (1-q)^{\binom{\# \text{ gen.}}{\text{rounds}}} q^{\binom{\# \text{ game}}{\text{rounds}}} 2^{\left[(q^{-1})\binom{\# \text{ of}}{\text{failures}}\right]} |b\rangle\langle b| \otimes I.$$

An inductive argument proves that $d_{1+q}(\Gamma\|\Sigma) \leq C^{-N}$. This inequality is sufficient to deduce that the Renyi entropy of the "success" state σ s grows linearly in N. One can therefore deduce that (for appropriate parameters) the outputs of Protocol A contain a linear number of extractable quantum proof bits.

It may be further proved that: if Protocol A is executed with a partially trusted measurement device (i.e., a measurement device whose measurements are anticommunicative only with a certain positive probability) then it produces a linear amount of randomness. This generalization may be crucial for the carrying over of results into a fully device-independent setting.

Simulation Results for Partially Trusted Devices:

A second insight enabling, at least in some cases, properties of the protocols discussed herein is that nonlocal games simulate partially trusted devices. When certain nonlocal games are played —even with a device that is completely untrusted—their outcomes may match the behavior of a device that is partially trusted.

To illustrate this, a class of devices is formalized as follows. Definition: Let n be a positive integer. A "binary quantum device" with n components $D=(D_1, \ldots, D_n)$ include the following:

1. Quantum system and a density operator φ on $Q_1 \otimes \ldots \otimes Q_n$ which defines the initial state of the systems.
2. For any k≥0, and any "transcript" T (representing the collective previous inputs and outputs during previous rounds) a unitary operator $U_T: \otimes Q_i \to \otimes Q_i$ and a collection of Hermitian operator $M_{T,j}^{(b)}$ on $Q_1$ satisfying $\|M_{T,j}^{(b)}\| \leq 1$.

The behavior of the device D is as follows: at round i, the devices first collectively perform the unitary operation $U_T$, and then, according to their inputs $b_i$, each performs binary measurements specified by the operators $M^{bi}_{T,j}$. (This device model allows communication in between rounds, in an implementation)

Now a somewhat more specific type of device is defined. Suppose that E is a single-part binary quantum device. Say that E is a partially trusted device with parameters (u, v) if the measurement operators $N^{(1)}_T$ that E uses on input 1 decompose as:

$$N_T^{(1)} = (v)P_T + (u-v)Q_T,$$

where $P_T$ is perfectly anti-commutative with the other measurement $N^{(0)}_T$, and $Q_T$ satisfies $\|Q_T\| \leq 1$ (and is otherwise unspecified). Essentially, the device behaves as follows. On input 0, it performs a perfect measurement. On input 1, it does one of the following at random: it performs a perfectly anti-commuting measurement (probability=v), or it performs an unknown measurement (probability=u-v), or it ignores its quantum system and merely outputs a perfect coin flip (probability=1-u). (The second possibility is referred to herein as a "dishonest mistake," and the third is referred to herein as an "honest mistake.")

Proving that untrusted devices can be simulated by partially trusted devices is an example of a task that is fairly easy in the classical security context but difficult in the quantum context. For example, if one knows that a quantum device performs at a superclassical level at a particular nonlocal game, then one knows that its outcomes are at least partly random, and thus can be "simulated" by a biased coin flip (or a "partially trusted" coin flip). But to prove quantum security one needs a stronger notion of simulation—one that allows for the possibility quantum side information.

The basis for a simulation result may be certain known properties of quantum self-testing. Games from the class of strong self-tests are considered (although, as discussed further above, contextuality games may also be implemented in one or more protocols discussed herein):

Theorem. Let G be a strong self-test, and let D be an (untrusted) binary device with n components. Then, the behavior of D Protocol R can be simulated by a partially trusted device.

Reducing to the case where dim $Q_i=2$, each measurement operator being projective, and after an appropriate choice of basis:

$$M_j^{(0)} = \begin{bmatrix} 0 & 1 \\ 1 & 0 \end{bmatrix}; M_j^{(1)} = \begin{bmatrix} 0 & \alpha_j \\ \overline{\alpha}_j & 0 \end{bmatrix},$$

with $|\alpha_j|=1$. The output of D during a generation round is derived from the measurement operator $M^{(0)}_j \otimes I \otimes \ldots \otimes I$, which, under an appropriate basis, can be represented as the block matrix $$\begin{bmatrix} 0 & I \\ I & 0 \end{bmatrix}$$

on $C^{2n}$. The behavior of D during a game round can be given represented by a reverse diagonal Hermitian matrix M on $C^{2n}$ with entries:

$$P_1(\alpha_1, \ldots, \alpha_n), P_2(\alpha_1, \ldots, \alpha_n), P_3(\alpha_1, \ldots, \alpha_n) \ldots,$$
$$\overline{P}_2(\alpha_1, \ldots, \alpha_n), \overline{P}_1(\alpha_1, \ldots, \alpha_n),$$

where $\{P_i\}$ are rational functions depending on the game. Using the strong self-testing condition, the existence of another reverse diagonal matrix R is shown with entries, $\beta_1, \ldots, \beta_{2n-1}, \overline{\beta}_{2n-1}, \ldots, \beta_1$ which anti-commute with $M^{(0)}_j$ and which satisfies $\|M-R\|+\|R\|=\|M\|$. This implies that M satisfies the decomposition, $N_T^{(1)}=(v)P_T+(u-v)Q_T$, which defines a partially trusted device.

Proving the existence of the sequence $\beta_1, \ldots, \beta_{2n-1}$ is matter of manipulations of complex numbers. One surprising aspect of this proof is that depends critically on the fact that G is not only a self-test, but a strong self-test.

Protocol A'

Another protocol, Protocol A' (see further description with reference to FIG. 16), is the same as Protocol A except that a partially trusted measurement device is used. Protocol R can be simulated by Protocol A' for an appropriately chosen partially trusted device. This means not only that the probability distributions of the outputs of the two protocols are exactly the same, but also that there is a simulation of the behavior of any external quantum environment that may be possessed by an adversary. Since the Protocol A' with a partially trusted device produces a linear amount of min-entropy, the same is true of Protocol R. This completes the proof.

Untrusted Quantum Devices

For further clarity and by way of example, a formalization of some terminology and notation for describing certain example quantum devices is presented below:

Definition: Let n be a positive integer. Another example "binary quantum device" with n components $D=(D_1, \ldots, D_n)$ includes the following:

1. Quantum systems $Q_1, \ldots, Q_n$ whose initial state is specified by a density operator, $\phi: (Q_1 \otimes \ldots \otimes Q_n) \to (Q_1 \otimes \ldots \otimes Q_n)$.

2. For any $k \geq 0$, and any function $T: \{0,1\} \times \{1, 2, \ldots, k\} \times \{1, 2, \ldots, n\} \to \{0,1\}$, a unitary operator $U_T: (Q_1 \otimes \ldots \otimes Q_n) \to (Q_1 \otimes \ldots \otimes Q_n)$ and a collection of Hermitian operators $$\{M_{T,j}^{(b)}: Q_j \to Q_j\}_{\substack{b \in \{0,1\} \\ 1 \leq j \leq n}}$$

satisfying $\|M_{T,j}^{(b)}\| \leq 1$

The device D may behave as follows. Suppose that k iterations of the device have already taken place, and suppose that T is such that $T(0, i, j) \in \{0, 1\}$ and $T(1, i, j) \in \{0, 1\}$ represent the input bit and output bit, respectively, for the jth player on the ith round ($i \leq k$). (T is the transcript function.) Then, 1. The components $(D_1, \ldots, D_n)$ collectively perform the unitary operator $U_T$ on $Q_1 \otimes \ldots \otimes Q_n$.

2. Each component $(D_1, \ldots, D_n)$ receives its input bit $b_j$, then applies the binary nondestructive measurement on Q, given by:

$$X \mapsto \left(\sqrt{\frac{I + M_{T,j}^{(b)}}{2}}\right) \times \left(\sqrt{\frac{I + M_{T,j}^{(b)}}{2}}\right)$$

$$X \mapsto \left(\sqrt{\frac{I + M_{T,j}^{(b)}}{2}}\right) \times \left(\sqrt{\frac{I + M_{T,j}^{(b)}}{2}}\right),$$

and then outputs the result.

Simulation Untrusted Quantum Devices

Suppose that one binary quantum device D' simulates another binary quantum device D if, for any purifying systems E' and E (for D and D', respectively), and any input sequence $i_1, \ldots i_k \in \{0, 1\}^n$, the joint state of the outputs of D together with E is isomorphic to the joint state of the outputs of D' together with E' on the same input sequence. Similarly, let us say that a protocol X simulates another protocol Y if, for any purifying systems E and E' for the quantum devices used by X and Y, respectively, the joint state of E together with the outputs of X is isomorphic to the joint state of E' together with the outputs of Y.

Definition: Say that a binary quantum device D is in "canonical form" if each of its quantum systems $Q_j$ is such that $Q_j = C^{2m_j}$ for some $m_j > 1$, and each measurement operator pair $(M^{(0)}, M^{(1)}) = (M_{T,j}^{(1)}, M_{T,j}^{(1)})$ has the following $2 \times 2$ diagonal block form:

$$M^{(0)} = \begin{bmatrix} 0 & 1 & & & & \\ 1 & 0 & & & & \\ & & 0 & 1 & & \\ & & 1 & 0 & & \\ & & & & \ddots & \\ & & & & & 0 & 1 \\ & & & & & 1 & 0 \end{bmatrix};$$

$$M^{(1)} = \begin{bmatrix} 0 & \varsigma_1 & & & & \\ \bar{\varsigma}_1 & 0 & & & & \\ & & 0 & \varsigma_2 & & \\ & & \bar{\varsigma}_2 & 0 & & \\ & & & & \ddots & \\ & & & & & 0 & \varsigma_{m_j} \\ & & & & & \bar{\varsigma}_{m_j} & 0 \end{bmatrix},$$

Where the complex numbers $\varsigma_l$ satisfy $|\varsigma_l| = 1$ and $\text{Im}(\varsigma_l) \geq 0$. Note, that the complex numbers $\varsigma_l$ may be different for each transcript H and each player j. Discussing quantum devices in "canonical form," the description above and below may make use of the isomorphism $C^{2m} \cong C^2 \otimes C^m$ given by $e_{2k-1} \mapsto e_1 \otimes e_k, e_{2k} \mapsto e_2 \otimes e_k$ ($e_1, \ldots, e_r$ denote the standard basis vectors for $C^r$). It is proposed that any binary quantum device may be simulated by a device that is in canonical form.

Randomness Expansion with Untrusted Measurements

Definition: Let $u, v \in (0,1]$ be positive real numbers such that $v \leq u \leq 1$. Then a "partially trusted" device with parameters (u,v) includes the following data:

1. A single quantum system Q in an initial state $\phi$.

2. For every pair (i,o) of binary strings of equal length, two Hermitian operator $M_{i,o}^{(0)}, M_{i,o}^{(1)}$ on Q (e.g., representing measurements) satisfy the following conditions: (a) there exist perfectly anti-commuting measurement pairs $(T_{i,o}^{(0)}, T_{i,o}^{(1)})$ such that $M_{i,o}^{(0)} = T_{i,o}^{(0)}$ for all i,o; and (b) the operator $M_{i,o}^{(1)}$ decomposes as $M_{i,o}^{(1)} = (v)T_{i,o}^{(1)} + (u-v)N_{i,o}$, with $\|N_{i,o}\| \leq 1$.

Intuitively, a partially trusted device is a device D which always performs a trusted measurement $T^{(0)}$ on input 0, and on input 1, selects one of the three operators $(T^{(1)}, N, 0)$ at random according to the probability distribution (v, u−v, 1−u).

Consider example protocol A with the trusted device replaced by a partially trusted device. The outputs of Protocol A' may be as follows: let $g_i$ denote the bit g from the ith round of the protocol, and let G denote a classical register which consists of the bits $g_1, g_2, \ldots, g_N$. Let $o_i$ be equal to 0 if the outcome of the ith round is P or H, and let $o_i$ be equal to 1 if the outcome of the ith round is F or T. Let O be a classical register consisting of the bits $o_1, o_2, \ldots, o_N$. Also, succ may denote the "success" event in Protocol A'.

Theorem: Let u, v, $\delta > 0$ be real number with $0 < v \leq u \leq 1$. Then, there exits constants $q_0, \eta_0, b, c > 0$ such that the following holds. If Protocol A' is executed with arguments (N, q, $\eta$, u, v, D), where $q < q_0, \eta < \eta_0$, and if the success probability is at least $2^{-cNq}$, then $$H_{min}^\epsilon(O|EG, succ) \geq (1-\delta)N,$$

where $\epsilon = \sqrt{2} \cdot 2^{-bNq}$.

Simulation—Expansion with Untrusted Measurements

Theorem: For any n-player strong self-test G which is positively aligned, there exists $\delta_G > 0$ such that the following holds. For any n-part binary quantum device D, there exists a partially trusted device D' with parameters $q_G$, $\delta_G$ such that Protocol A' (with arguments N, q, $\eta$, $g_G$, $\delta_G$, D') simulates Protocol R (with arguments N, q, n, D, G).

Consider the behavior of the device D in a first round. It may be assumed that the measurements performed by $D_1, \ldots, D_n$ are in canonical form. Write the underlying space as $(C^2 \otimes W_1) \otimes \ldots \otimes (C^2 \otimes W_n)$. If g=0, the measurement performed by $D_1$ is given by the operator:

$$\begin{bmatrix} & & & & 1 \\ & & & 1 & \\ & & \iddots & & \\ & 1 & & & \\ 1 & & & & \\ & & & & 1 \\ & & & \ddots & \\ & & 1 & & \end{bmatrix} \otimes I_{W_1 \otimes \ldots \otimes W_n},$$

(where the matrix on the left is an operator on $(C^2)^{\otimes n}$, with the basis taken in lexiographic order).

If g=1 the measurement performed by D is given by the scoring operator M. For some unit-length complex number $\alpha$, and for any choices of unit-length complex numbers $\alpha_1, \ldots, \alpha_{2^{(n-1)}-1}$, there is a decomposition for M in the form $M = \delta_G M' + (q_G - \delta_G) M''$ with $$M'' = \begin{bmatrix} & & & & \alpha \\ & & & \alpha_1 & \\ & & \iddots & & \\ & & \alpha_{2^{n-1}-1} & & \\ & \overline{\alpha}_{2^{n-1}-1} & & & \\ & \iddots & & & \\ & \overline{\alpha}_1 & & & \\ \overline{\alpha} & & & & \end{bmatrix} \otimes I_{W_1 \otimes \ldots \otimes W_n}$$

and $\|M''\| \leq 1$. To simulate the behavior of D with a partially trusted device, we may choose $\alpha_1, \ldots, \alpha_{2^{(n-1)}-1}$ so that M' is perfectly anti-commutative with the operator G.3. This can be done, for example, by setting $\alpha_1, \alpha_2, \ldots, \alpha_{2^{(n-1)}-1}$ to be equal to $\alpha$, and $\alpha_{2^{(n-2)}}, \ldots, \alpha_{2^{(n-1)}-1}$ to be equal to $-\alpha$. Thus the behavior of the device D in the first round of Protocol R can be simulated by a partially trusted device with parameters $(q_G - \delta_G, \delta_G)$. Similar reasoning shows the desired simulation result across all rounds. Further, this theorem holds true without the assumption that G is positively aligned.

Theorem: Let G be a strong self-test and let $\delta > 0$ be a real number. Then, there exist constants $q_0, \eta_o, b, c > 0$ such that the following holds. If Protocol R is executed with arguments (N, q, $\eta$, G, D), where $q < q_0$, $\eta < \eta_0$, and if the success probability is at least $2^{-cNq}$, then $$H_{min}^{\epsilon}(O|EG,succ) \geq (1-\delta)N,$$

where $\epsilon = \sqrt{2} \cdot 2^{-bNq}$.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of the example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as an example only and does not describe every possible embodiment, as describing every possible embodiment would be impractical, if not impossible. One could implement numerous alternate embodiments, using either current technology or technology developed after the filing date of this application.

What is claimed is:

1. A method of generating a random bit string, the method comprising:
   receiving, from a min-entropy source, a binary input string;
   creating copies of the binary input string received from the min-entropy source;
   providing each of the copies of the binary input string to one of a plurality of randomness extractors, each randomness extractor configured to perform a different randomness extraction on the received copy of the binary input string to produce a respective extracted output binary string;
   for each randomness extractor, providing the respective extracted output binary string to one of a plurality of quantum devices, where each of the plurality of quantum devices is configured to (i) receive the extracted output binary string as a locally random input signal string, random only to that respective quantum device, and (ii) transform the received locally random input string into a globally random output signal string, random to each other of the plurality of quantum devices; and
   combining the plurality of globally random output signal strings from the plurality of quantum devices to generate the random bit string.

2. The method of claim 1, wherein each of the plurality of quantum devices is an untrusted device.

3. The method of claim 2, wherein each of the plurality of quantum devices comprises a quantum mechanical information-processing unit.

4. The method of claim 1, wherein each randomness extractor has a fixed value for a seed argument.

5. The method of claim 1, wherein each of the plurality of quantum devices is configured to transform the received locally random input string into a globally random output signal string, under a predetermined completeness error and a predetermined soundness error.

6. The method of claim 1, wherein the combining the plurality of globally random output signal strings from the plurality of quantum devices to generate the random bit string is achieved by combining the plurality of globally random output signal strings using a bit-wise XOR stage.

7. The method of claim 1, wherein the plurality of quantum devices include at least one of a non-Abelian topologically ordered phase of matter, an Ising spin glass, a three dimensional (3D) lattice cluster state, one or more superconducting systems, one or more trapped atoms, ions, or molecules, one or more quantum dots, one or more optical elements, or a Bose-Einstein condensate.

8. The method of claim 1, wherein the plurality of quantum devices apply a device independent quantum key distribution protocol.

9. The method of claim 1, wherein the plurality of quantum devices apply a device independent randomness expansion protocol.

10. The method of claim 1, further comprising performing a randomness certification on each of the globally random output signal strings from the plurality of quantum devices.

11. The method of claim 10, further comprising combining a plurality of randomness certification accept/abort decisions into a global decision stage for determining whether to accept or abort the random bit string.

12. A method of generating a random bit string, the method comprising:
receiving, from each of one or more min-entropy sources, a binary input string;
interacting with one or more input/output devices, where each input/output device is an untrusted system configured to produce a global randomness output from a local randomness input seed;
determining whether to accept the global randomness output from each of the input/output devices or to reject the global randomness output from each of the input/output devices; and
outputting the random bit string, if the global randomness output from each of the input/output devices is accepted.

13. The method of claim 12, wherein each of the one or more input/output devices comprises a quantum mechanical information-processing unit.

14. The method of claim 12, wherein determining whether to accept the global randomness output from each of the input/output devices or to reject the global randomness output from each of the input/output devices comprises performing a randomness certification on each of the global randomness outputs from each of the one or more input/output devices.

15. The method of claim 12, wherein each of the input/output devices include at least one of a non-Abelian topologically ordered phase of matter, an Ising spin glass, a three dimensional (3D) lattice cluster state, one or more superconducting systems, one or more trapped atoms, ions, or molecules, one or more quantum dots, one or more optical elements, or a Bose-Einstein condensate.

16. The method of claim 12, further comprising:
communicating received binary input strings from the one or more min-entropy sources to a deterministic procedure controller configured to determine whether to accept the global randomness output from each of the input/output devices or to reject the global randomness output from each of the input/output devices.

17. The method of claim 16, wherein further comprising communicating received binary input strings from the one or more min-entropy sources to the deterministic procedure controller using a secured communication channel.

18. The method of claim 16, wherein further comprising communicating received binary input strings from the one or more min-entropy sources to the deterministic procedure controller using a public, unsecured communication channel.

19. A system for generating a random bit string, the system comprising:
a classical controller configured (i) to receive, from a min-entropy source, a binary input string, (ii) to duplicate the binary input string to create copies of the binary input string, and (iii) provide each of the copies of the binary input string to one of a plurality of randomness extractors, each randomness extractor configured to perform a different randomness extraction on the received copy of the binary input string to produce a respective extracted output binary string;
a plurality of quantum devices each configured to (i) receive the extracted output binary string as a locally random input signal string, random only to that respective quantum device, and (ii) transform the received locally random input string into a globally random output signal string, random to each other of the plurality of quantum devices; and
a combination stage configured to combine the plurality of globally random output signal strings from the plurality of quantum devices to generate the random bit string.

20. The system of claim 19, further comprising a deterministic procedure controller configured to perform a randomness certification on each of the globally random output signal strings from the plurality of quantum devices.

21. A system for generating a random bit string, the system comprising:
a classical controller configured to
receive, from each of one or more min-entropy sources, a binary input string,
interact with one or more input/output devices, where each input/output device is an untrusted system configured to produce a global randomness output from a local randomness input seed,
determine whether to accept the global randomness output from each of the input/output devices or to reject the global randomness output from each of the input/output devices, and
output the random bit string, if the global randomness output from each of the input/output devices is accepted.

* * * * *